US009712419B2

(12) United States Patent
Matityahu et al.

(10) Patent No.: US 9,712,419 B2
(45) Date of Patent: Jul. 18, 2017

(54) INTEGRATED SWITCH TAP ARRANGEMENT AND METHODS THEREOF

(75) Inventors: Eldad Matityahu, Palo Alto, CA (US);
Robert Shaw, Los Gatos, CA (US);
Dennis Carpio, San Jose, CA (US); Ky Le, San Jose, CA (US)

(73) Assignee: Ixia, Calabasas, CA (US)

( * ) Notice: Subject to any disclaimer, the term of this patent is extended or adjusted under 35 U.S.C. 154(b) by 467 days.

(21) Appl. No.: 13/346,651

(22) Filed: Jan. 9, 2012

(65) Prior Publication Data

US 2012/0176917 A1 Jul. 12, 2012

Related U.S. Application Data

(63) Continuation of application No. 12/481,847, filed on Jun. 10, 2009, now Pat. No. 8,094,576, which is a continuation-in-part of application No. 11/835,233, filed on Aug. 7, 2007, now Pat. No. 7,903,576.

(51) Int. Cl.
*H04L 12/26* (2006.01)

(52) U.S. Cl.
CPC .......... *H04L 43/12* (2013.01); *H04L 43/0876* (2013.01)

(58) Field of Classification Search
USPC ........................................ 370/241, 252, 253
See application file for complete search history.

(56) References Cited

U.S. PATENT DOCUMENTS

| | | |
|---|---|---|
| 4,802,161 A | 1/1989 | Byars et al. |
| 5,173,794 A | 12/1992 | Cheung et al. |
| 5,442,629 A | 8/1995 | Geyer et al. |
| 5,539,727 A | 7/1996 | Kramarczyk et al. |
| 5,550,802 A | 8/1996 | Worsley et al. |

(Continued)

FOREIGN PATENT DOCUMENTS

| | | |
|---|---|---|
| AU | 2010258799 | 6/2016 |
| EP | 2091199 | 8/2009 |

(Continued)

OTHER PUBLICATIONS

"Extended European Search Report", European Patent Application No. 06785879.5, Mailing Date: Nov. 29, 2011.

(Continued)

*Primary Examiner* — Hassan Kizou
*Assistant Examiner* — Ashil Farahmand
(74) *Attorney, Agent, or Firm* — Jenkins, Wilson, Taylor & Hunt, P.A.

(57) ABSTRACT

An integrated switch tap device for managing and monitoring network traffic is provided. The device includes a set of network ports for receiving and outputting the network traffic. The device also includes a first logic arrangement for performing routing functionalities and a first CPU for processing the routing functionalities. The device further includes a set of monitoring ports that is coupled to one or more monitoring devices. The device yet also includes a first tap module, which is configured at least for intercepting at least part of the network traffic flowing through the network device, creating a copy of at least part of the network traffic, and forwarding the copy to at least one of the set of monitoring ports. The device moreover includes a second CPU configured at least for processing tap functionalities associated with the first tap module.

17 Claims, 11 Drawing Sheets

(56) References Cited

U.S. PATENT DOCUMENTS

| | | |
|---|---|---|
| 5,550,803 A | 8/1996 | Crayford et al. |
| 5,648,965 A | 7/1997 | Thadani et al. |
| 5,696,859 A | 12/1997 | Onaka et al. |
| 5,710,846 A | 1/1998 | Wayman et al. |
| 5,715,247 A | 2/1998 | Nara et al. |
| 5,774,453 A | 6/1998 | Fukano et al. |
| 5,781,318 A | 7/1998 | Tremblay |
| 5,825,775 A | 10/1998 | Chin et al. |
| 5,850,385 A | 12/1998 | Esaki |
| 5,887,158 A | 3/1999 | Sample et al. |
| 5,898,837 A | 4/1999 | Guttman et al. |
| 5,983,308 A | 11/1999 | Kerstein |
| 6,041,037 A | 3/2000 | Nishio et al. |
| 6,041,307 A | 3/2000 | Ahuja et al. |
| 6,047,321 A | 4/2000 | Raab et al. |
| 6,108,310 A | 8/2000 | Wilkinson et al. |
| 6,167,025 A | 12/2000 | Hsing et al. |
| 6,181,677 B1 | 1/2001 | Valli et al. |
| 6,239,579 B1 | 5/2001 | Dunn et al. |
| 6,272,113 B1 | 8/2001 | McIntyre et al. |
| 6,272,136 B1 | 8/2001 | Lin et al. |
| 6,289,511 B1 | 9/2001 | Hübinette |
| 6,366,557 B1 | 4/2002 | Hunter |
| 6,381,218 B1 | 4/2002 | McIntyre et al. |
| 6,389,550 B1 | 5/2002 | Carter |
| 6,424,627 B1 | 7/2002 | Sorhaug et al. |
| 6,449,247 B1 | 9/2002 | Manzardo et al. |
| 6,530,047 B1 | 3/2003 | Edwards et al. |
| 6,542,145 B1 | 4/2003 | Reisinger et al. |
| 6,650,803 B1 | 11/2003 | Ramaswami et al. |
| 6,658,565 B1 | 12/2003 | Gupta et al. |
| 6,687,009 B2 | 2/2004 | Hui et al. |
| 6,687,847 B1 | 2/2004 | Aguilera et al. |
| 6,697,863 B1 | 2/2004 | Egawa et al. |
| 6,714,976 B1 | 3/2004 | Wilson et al. |
| 6,798,740 B1 | 9/2004 | Senevirathne et al. |
| 6,801,940 B1 | 10/2004 | Moran et al. |
| 6,823,383 B2 | 11/2004 | MacBride |
| 6,836,540 B2 | 12/2004 | Falcone et al. |
| 6,841,985 B1 | 1/2005 | Fetzer |
| 6,850,706 B2 | 2/2005 | Jager et al. |
| 6,882,654 B1 | 4/2005 | Nelson |
| 6,895,005 B1 | 5/2005 | Malin et al. |
| 6,898,630 B2 | 5/2005 | Ueno et al. |
| 6,898,632 B2 | 5/2005 | Gordy et al. |
| 6,914,892 B1 | 7/2005 | Cooper et al. |
| 6,925,052 B1 | 8/2005 | Reynolds et al. |
| 6,944,437 B2 | 9/2005 | Yang et al. |
| 6,975,209 B2 | 12/2005 | Gromov |
| 7,027,437 B1 | 4/2006 | Merchant et al. |
| 7,061,942 B2 | 6/2006 | Noronha, Jr. et al. |
| 7,171,504 B2 | 1/2007 | Ishii |
| 7,275,100 B2 | 9/2007 | Yamagami |
| 7,277,957 B2 | 10/2007 | Rowley et al. |
| 7,284,055 B1 | 10/2007 | Oehrke et al. |
| 7,308,705 B2 | 12/2007 | Gordy et al. |
| 7,321,565 B2 | 1/2008 | Todd et al. |
| 7,324,553 B1 | 1/2008 | Varier et al. |
| 7,362,765 B1 | 4/2008 | Chen |
| 7,415,013 B1 | 8/2008 | Lo |
| 7,430,354 B2 | 9/2008 | Williams |
| 7,477,611 B2 | 1/2009 | Huff |
| 7,486,624 B2 | 2/2009 | Shaw et al. |
| 7,486,625 B2 | 2/2009 | Matityahu et al. |
| 7,499,412 B2 | 3/2009 | Matityahu et al. |
| 7,505,416 B2 | 3/2009 | Gordy et al. |
| 7,522,543 B2 | 4/2009 | Matityahu et al. |
| 7,573,896 B2 | 8/2009 | Wang et al. |
| 7,594,095 B1 | 9/2009 | Nordquist |
| 7,599,301 B2 | 10/2009 | Matityahu et al. |
| 7,616,587 B1 | 11/2009 | Lo et al. |
| 7,627,029 B2 | 12/2009 | Ho et al. |
| 7,760,859 B2 | 7/2010 | Matityahu et al. |
| 7,773,529 B2 | 8/2010 | Matityahu et al. |
| 7,788,365 B1 | 8/2010 | Foster et al. |
| 7,809,960 B2 | 10/2010 | Cicchetti et al. |
| 7,813,263 B2 | 10/2010 | Chang et al. |
| 7,822,340 B2 | 10/2010 | Matityahu et al. |
| 7,835,265 B2 | 11/2010 | Wang et al. |
| 7,898,984 B2 | 3/2011 | Matityahu et al. |
| 7,903,576 B2 | 3/2011 | Matityahu et al. |
| 7,953,839 B2 | 5/2011 | Sim et al. |
| 8,018,856 B2 | 9/2011 | Matityahu et al. |
| 8,077,049 B2 | 12/2011 | Yaney et al. |
| 8,094,576 B2 | 1/2012 | Matityahu et al. |
| 8,320,242 B2 | 11/2012 | Matityahu et al. |
| 8,325,716 B2 | 12/2012 | Ni |
| 8,369,218 B2 | 2/2013 | Matityahu et al. |
| 8,432,827 B2 | 4/2013 | Matityahu et al. |
| 8,582,472 B2 | 11/2013 | Matityahu et al. |
| 8,654,932 B2 | 2/2014 | Matityahu et al. |
| 8,737,197 B2 | 5/2014 | Matityahu et al. |
| 8,755,293 B2 | 6/2014 | Matityahu et al. |
| 8,902,735 B2 | 12/2014 | Matityahu et al. |
| 9,019,863 B2 | 4/2015 | Matityahu et al. |
| 9,306,959 B2 | 4/2016 | Matityahu et al. |
| 2001/0040870 A1 | 11/2001 | Ohmori et al. |
| 2002/0003592 A1 | 1/2002 | Hett et al. |
| 2002/0023184 A1 | 2/2002 | Paul |
| 2002/0026374 A1 | 2/2002 | Moneymaker et al. |
| 2002/0032880 A1 | 3/2002 | Poletto et al. |
| 2002/0061027 A1 | 5/2002 | Abiru et al. |
| 2002/0073199 A1 | 6/2002 | Levine et al. |
| 2002/0078178 A1 | 6/2002 | Senoh |
| 2002/0087710 A1 | 7/2002 | Aiken et al. |
| 2002/0110148 A1 | 8/2002 | Hickman et al. |
| 2002/0146016 A1 | 10/2002 | Liu et al. |
| 2002/0176355 A1 | 11/2002 | Mimms et al. |
| 2002/0180592 A1 | 12/2002 | Gromov |
| 2003/0033406 A1 | 2/2003 | John et al. |
| 2003/0061340 A1 | 3/2003 | Sun et al. |
| 2003/0090995 A1 | 5/2003 | Illikkal et al. |
| 2003/0112760 A1 | 6/2003 | Puppa et al. |
| 2003/0142666 A1 | 7/2003 | Bonney et al. |
| 2003/0145039 A1 | 7/2003 | Bonney et al. |
| 2003/0147385 A1 | 8/2003 | Montalvo et al. |
| 2003/0184386 A1 | 10/2003 | Varner et al. |
| 2003/0215236 A1 | 11/2003 | Manifold |
| 2004/0008675 A1 | 1/2004 | Basso et al. |
| 2004/0023651 A1 | 2/2004 | Gollnick et al. |
| 2004/0046516 A1 | 3/2004 | Uekawa |
| 2004/0062556 A1 | 4/2004 | Kubo et al. |
| 2004/0085893 A1 | 5/2004 | Wang et al. |
| 2004/0090934 A1 | 5/2004 | Cha et al. |
| 2004/0096227 A1 | 5/2004 | Bulow |
| 2004/0109411 A1 | 6/2004 | Martin |
| 2004/0120259 A1 | 6/2004 | Jones et al. |
| 2004/0128380 A1 | 7/2004 | Chen et al. |
| 2004/0190547 A1 | 9/2004 | Gordy et al. |
| 2004/0202164 A1 | 10/2004 | Hooper et al. |
| 2004/0215832 A1 | 10/2004 | Gordy et al. |
| 2004/0236866 A1 | 11/2004 | Dugatkin et al. |
| 2004/0243702 A1 | 12/2004 | Vainio et al. |
| 2004/0264494 A1 | 12/2004 | Kim |
| 2005/0005031 A1 | 1/2005 | Gordy et al. |
| 2005/0018618 A1 | 1/2005 | Mualem et al. |
| 2005/0050205 A1 | 3/2005 | Gordy et al. |
| 2005/0060535 A1 | 3/2005 | Bartas |
| 2005/0071711 A1 | 3/2005 | Shaw |
| 2005/0108444 A1 | 5/2005 | Flauaus et al. |
| 2005/0122910 A1 | 6/2005 | Parupudi et al. |
| 2005/0129033 A1 | 6/2005 | Gordy et al. |
| 2005/0132051 A1 | 6/2005 | Hill et al. |
| 2005/0213512 A1 | 9/2005 | Konuma et al. |
| 2005/0231367 A1 | 10/2005 | Bellantoni |
| 2005/0257262 A1 | 11/2005 | Matityahu et al. |
| 2005/0271065 A1 | 12/2005 | Gallatin et al. |
| 2005/0278565 A1 | 12/2005 | Frattura et al. |
| 2006/0002292 A1 | 1/2006 | Chang et al. |
| 2006/0083268 A1 | 4/2006 | Holaday et al. |
| 2006/0083511 A1 | 4/2006 | Edmunds et al. |
| 2006/0106929 A1* | 5/2006 | Kenoyer ............ H04L 29/06027 709/224 |
| 2006/0153092 A1 | 7/2006 | Matityahu et al. |

(56) References Cited

U.S. PATENT DOCUMENTS

| | | |
|---|---|---|
| 2006/0200711 A1 | 9/2006 | Schondelmayer et al. |
| 2006/0215566 A1 | 9/2006 | Walsh |
| 2006/0233115 A1 | 10/2006 | Matityahu et al. |
| 2006/0282529 A1 | 12/2006 | Nordin |
| 2007/0002754 A1 | 1/2007 | Matityahu et al. |
| 2007/0002755 A1 | 1/2007 | Matityahu et al. |
| 2007/0002769 A1 | 1/2007 | Matityahu et al. |
| 2007/0064917 A1 | 3/2007 | Matityahu et al. |
| 2007/0081549 A1 | 4/2007 | Cicchetti et al. |
| 2007/0081553 A1 | 4/2007 | Cicchetti et al. |
| 2007/0121499 A1 | 5/2007 | Pal et al. |
| 2007/0140398 A1 | 6/2007 | Inoue et al. |
| 2007/0171908 A1 | 7/2007 | Tillman et al. |
| 2007/0171966 A1 | 7/2007 | Light et al. |
| 2007/0174492 A1 | 7/2007 | Light et al. |
| 2007/0189171 A1 | 8/2007 | Abrahams |
| 2007/0211682 A1 | 9/2007 | Kim et al. |
| 2007/0213862 A1 | 9/2007 | Chang et al. |
| 2007/0218874 A1 | 9/2007 | Sinha et al. |
| 2007/0253329 A1 | 11/2007 | Rooholamini et al. |
| 2007/0297342 A1 | 12/2007 | Yasuta |
| 2008/0013467 A1 | 1/2008 | Light et al. |
| 2008/0014879 A1 | 1/2008 | Light et al. |
| 2008/0049627 A1 | 2/2008 | Nordin |
| 2008/0072291 A1 | 3/2008 | Carley |
| 2008/0144613 A1 | 6/2008 | Adhikari et al. |
| 2008/0168283 A1 | 7/2008 | Penning |
| 2008/0198742 A1 | 8/2008 | Kaempfer |
| 2008/0214108 A1 | 9/2008 | Beigne et al. |
| 2008/0296685 A1 | 12/2008 | Sonehara et al. |
| 2009/0040932 A1 | 2/2009 | Matityahu et al. |
| 2009/0041051 A1 | 2/2009 | Matityahu et al. |
| 2009/0168659 A1 | 7/2009 | Matityahu et al. |
| 2009/0178144 A1 | 7/2009 | Redlich et al. |
| 2009/0210649 A1 | 8/2009 | Wan et al. |
| 2009/0219808 A1 | 9/2009 | Ogura |
| 2009/0245128 A1 | 10/2009 | Matityahu et al. |
| 2009/0279541 A1 | 11/2009 | Wong et al. |
| 2009/0303883 A1 | 12/2009 | Kucharczyk et al. |
| 2010/0014605 A1 | 1/2010 | Geile et al. |
| 2010/0135313 A1 | 6/2010 | Davis et al. |
| 2010/0146113 A1 | 6/2010 | Matityahu et al. |
| 2010/0167713 A1 | 7/2010 | Hoffman |
| 2010/0183298 A1 | 7/2010 | Biegert et al. |
| 2010/0195538 A1 | 8/2010 | Merkey et al. |
| 2010/0247068 A1 | 9/2010 | Howarter et al. |
| 2010/0254310 A1 | 10/2010 | Kats et al. |
| 2010/0278052 A1 | 11/2010 | Matityahu et al. |
| 2011/0149801 A1 | 6/2011 | Matityahu et al. |
| 2011/0161544 A1 | 6/2011 | Chengson et al. |
| 2011/0164521 A1 | 7/2011 | Matityahu et al. |
| 2011/0211446 A1 | 9/2011 | Matityahu et al. |
| 2011/0211473 A1 | 9/2011 | Matityahu et al. |
| 2012/0002552 A1 | 1/2012 | Matityahu et al. |

FOREIGN PATENT DOCUMENTS

| | | |
|---|---|---|
| JP | 2001-197066 A | 7/2001 |
| JP | 2006-148686 A | 6/2006 |
| KR | 10-2004-0058415 A | 7/2004 |
| TW | I508491 B | 11/2015 |
| WO | WO 01/63838 A1 | 8/2001 |
| WO | WO-02/19642 A1 | 3/2002 |
| WO | WO-2004/012163 A2 | 2/2004 |
| WO | WO-2005/043838 A1 | 5/2005 |
| WO | WO 2009/021122 A2 | 2/2009 |

OTHER PUBLICATIONS

"International Preliminary Report on Patentability", PCT Application No. PCT/US2008/080598; Mailing Date: Aug. 24, 2011.
"International Preliminary Report on Patentability", PCT Application No. PCT/US2010/037985, Mailing Date: Dec. 22, 2011.
"Final Office Action", U.S. Appl. No. 10/834,448, Mailing Date: Jun. 27, 2011.
"Non-Final Office Action", U.S. Appl. No. 10/834/448, Mailing Date: Dec. 22, 2010.
"International Search Report", PCT Application No. PCT/US2011/026160, Mailing Date: Nov. 24, 2011.
"Written Opinion", PCT Application No. PCT/US2011/026160, Mailing Date: Nov. 24, 2011.
Belkin International, Inc., "Belkin Quick Installation Guide", N1 Vision Wireless Router, Belkin International Inc., Compton, CA, Feb. 11, 2009, 3 pages total.
HP, et al., "Reduced Gigabit Media Independent Interface (RGMII)", Nov. 30, 2005, http://web.archive.org/web/20051113015000/http://www.hp.com/rnd/pdfs/RGMIIv2_0_final_hp.Pdf.
Wikipedia, "Field-programmable Gate Array", Jan. 21, 2005, http://web.archive.org/web/20050121193052/http://en.wi kiped ia.org/wiki/Field-programmable_gate_array.
Xilinx, "LogiCore OPB Ethernet Lite Media Access Controller", v1.01b, Mar. 3, 2006.
"Fast Ethernet Fiber-to-Fiber Converters", Canary Communications, Inc. 7 pages total, 2004.
"Sequence Reducer/ Sequence Mirror Operator's Guide", Peribit Networks, Inc. 13 pages total, 2001-2005.
"PeriScope Central Management System (CMS) 5.0 Administrator's Guide", Peribit Networks, Inc. 13 pages total. 2003-2004.
"VSS Coppertap Literature", VSS Monitoring inc. 2 pages 2003-2004.
"VSS Easy Install Guide", VSS Monitoring Inc. 8 pages total. 2003-2005.
"VSS Linksafe", VSS Monitoring Inc., 1 page. 2003-2005.
Anonymous, "100Base-TX/100BBase-FX Media Converters E-100BTX-FX-04 User's Guide", Transitions Networks, Minneapolis, MN, Copyright 1998-2000, 4 pages.
Gigamon Systems LLC, "GigaVUE—Product Brief", Gigamon Systems LLC, http://web.archive.org/web/20070815021951/www.gigamon.com.pdf/GigamonSystems-OnePageProductBrief.pdf, Aug. 15, 2007, 1 page.
"Written Opinion", Issued in PCT Application No. PCT/US2006/25436, Mailing Date: Mar. 4, 2008.
"International Search Report", Issued in PCT Application No. PCT/US2006/25436, Mailing Date: Mar. 4, 2008.
"International Preliminary Report on Patentability", Application No. PCT/US06/25436, Mailing Date: May 22, 2008.
"Non Final Office Action", U.S. Appl. No. 11/223,477, Mailing Date: Jun. 12, 2008.
"Non Final Office Action", U.S. Appl. No. 11/174,033, Mailing Date: May 29, 2008.
"Final Office Action", U.S. Appl. No. 11/174,033, Mailing Date: Dec. 10, 2008.
"Non Final Office Action", U.S. Appl. No. 11/174,033, Mailing Date: Sep. 15, 2009.
"Final Office Action", U.S. Appl. No. 11/174,033, Mailing Date: Jun. 24, 2010.
"Non Final Office Action", U.S. Appl. No. 11/174,033, Mailing Date: Apr. 28, 2011.
"Non Final Office Action", U.S. Appl. No. 11/174,032, Mailing Date: Apr. 23, 2008.
"Inter Partes Reexamination Office Action", U.S. Appl. No. 95/001,318, Patent in Re-examination: U.S. Pat. No. 7,486,625, Mailing Date: Apr. 23, 2010.
"Replacement Statement and Explanation under 37CFR 1.915 In Support of 12 Request for Inter Partes Reexamination of U.S. Pat. No. 7,486,625", Sonnenschein Nath & Rosenthal LLP, Jan. 22, 2010, 251 pages.
"Request for Inter Partes Reexamination U.S. Pat. No. 7,486,625", Sonnenschein Nath & Rosenthal LLP, Dec. 18, 2009, 69 pages.
Non Final Office Action, U.S. Appl. No. 11/174,238, Mailing Date: Oct. 1, 2008.
"International Preliminary Report on Patentability", Issued in PCT Application No. PCT/US2006/025437, Mailing Date: Jan. 17, 2008.
"International Search Report", Application No. PCT/US2006/25437, Mailing Date: Dec. 6, 2006.

(56) References Cited

OTHER PUBLICATIONS

"Written Opinion", Application No. PCT/US2006/25437, Mailing Date: Dec. 6, 2006.
"Non Final Office Action", U.S. Appl. No. 11/370,487, Mailing Date: Mar. 25, 2009.
"Non Final Office Action", U.S. Appl. No. 11/370,487, Mailing Date: Jun. 11, 2009.
"International Search Report", Issued in PCT Application No. PCT/US2008/072484, Mailing Date: Feb. 13, 2009.
"Written Opinion", Issued in PCT Application No. PCT/US2008/072484, Mailing Date: Feb. 13, 2009.
"International Preliminary Report on Patentability", Issued in PCT Application No. PCT/US2008/072484, Mailing Date: Feb. 18, 2010.
"Non Final Office Action", U.S. Appl. No. 11/835,228, Mailing Date: Sep. 9, 2010.
"International Search Report", Issued in PCT Application No. PCT/US2008/072493, Mailing Date: Feb. 13, 2009.
"Written Opinion", Issued in PCT Application No. PCT/US2008/072493, Mailing Date: Feb. 13, 2009.
"International Preliminary Report on Patentability", Issued in PCT Application No. PCT/US2008/072493, Mailing Date: Feb. 18, 2010.
"Non Final Office Action", U.S. Appl. No. 11/835,233, Mailing Date: Jun. 9, 2009.
"Final Office Action", U.S. Appl. No. 11/835,233, Mailing Date: Oct. 30, 2009.
"Non Final Office Action", U.S. Appl. No. 11/835,233, Mailing Date: Jun. 25, 2010.
"International Search Report", Issued in PCT Application No. PCT/US2008/080598, Mailing Date: May 26, 2009.
"Written Opinion", Issued in PCT Application No. PCT/US2008/080598, Mailing Date: May 26, 2009.
"Notice of Allowance and Fees Due", U.S. Appl. No. 11/925,826, Mailing Date: Jun. 18, 2010.
"European Search Report", Issued in EP Patent Application No. EP 08 17 1759, Mailing Date: Jul. 31, 2009.
"Notice of Allowance and Fee(s) Due", U.S. Appl. No. 11/965;668, Oct. 8, 2009.
"Non Final Office Action", U.S. Appl. No. 12/705,195, Mailing Date: Dec. 27, 2010.
"Written Opinion", Issued in PCT Application No. PCT/US2010/037985, Mailing Date: Dec. 31, 2010.
"International Search Report", Issued in PCT Application No. PCT/US2010/037985, Mailing Date: Dec. 31, 2010.
"Non Final Office Action", U.S. Appl. No. 12/481,847, Mailing Date: Nov. 4, 2010.
"Final Office Action", U.S. Appl. No. 12/481,847, Mailing Date: Feb. 9, 2011.
"Non Final Office Action", U.S. Appl. No. 10/834,448, Mailing Date: Mar. 4, 2009.
"Final Office Action", U.S. Appl. No. 10/834,448, Mailing Date: Dec. 9, 2009.
"Non Final Office Action", U.S. Appl. No. 10/834,448, Mailing Date: Feb. 7, 2008.
"Non Final Office Action", U.S. Appl. No. 10/834,448, Mailing Date: Feb. 18, 2010.
"Final Office Action", U.S. Appl. No. 10/834,448, Mailing Date: Aug. 3, 2010.
"Non Final Office Action", U.S. Appl. No. 12/839,373, Mailing Date: Dec. 22, 2011.
"Final Office Action", U.S. Appl. No. 11/174,033, Mailing Date: Jan. 11, 2012.
Communication of European Search Report for European Patent Application No. 10786787.1 (Jun. 16, 2016).
Notice of Allowance for Australian Application No. 2010258799 (Mar. 10, 2016).
"Quick Installation Guide—N1 Vision Wireless Modem Router," Network Status Display, 2008 Belkin International, Inc. (2008).
10/100/1000 Bypass Switch Implementation, Oct. 17, 2007, 2 Pages.
Advisory Action for U.S. Appl. No. 10/834,448 (Sep. 23, 2010).
Advisory Action for U.S. Appl. No. 11/174,033 (Feb. 26, 2009).
Advisory Action for U.S. Appl. No. 11/174,033 (Jun. 13, 2012).
Advisory Action for U.S. Appl. No. 11/835,233 (Jan. 13, 2010).
Advisory Action for U.S. Appl. No. 12/481,847 (Feb. 25, 2011).
Advisory Action for U.S. Appl. No. 12/839,373 (Jan. 25, 2013).
Advisory Action for U.S. Appl. No. 13/034,730 (Sep. 12, 2013).
Applicant-Initiated Inteview Summary for U.S. Appl. No. 13/944,795 (Aug. 18, 2016).
Communication of the extended European search report for European Patent Application No. 11748111.9 (Aug. 24, 2016).
Communication pursuant to Article 94(3) EPC for European Patent Application No. 08 171 759.7 (Jun. 8, 2012).
Communication pursuant to Article 94(3) EPC for European Patent Application No. 12 760 718.2 (Jan. 17, 2017).
Extended European Search Report for European Patent Application No. 11748109.3 (Jul. 20, 2016).
Final Office Action for U.S. Appl. No. 13/034,732 (Oct. 2, 2013).
Final Office Action for U.S. Appl. No. 13/034,733 (Sep. 10, 2013).
Final Office Action for U.S. Appl. No. 13/034,736 (Jul. 11, 2013).
Final Office Action for U.S. Appl. No. 11/174,033 (Mar. 27, 2012).
Final Office Action for U.S. Appl. No. 12/839,373 (Nov. 15, 2012).
Final Office Action for U.S. Appl. No. 13/034,730 (Jun. 5, 2013).
Final Office Action for U.S. Appl. No. 13/070,086 (Aug. 9, 2013).
Final Office Action for U.S. Appl. No. 13/944,795 (Jun. 16, 2016).
International Preliminary Report on Patentability, PCT Application Number: PCT/US2011/026159, (Sep. 13, 2012).
International Preliminary Report on Patentability, PCT Application Number: PCT/US2011/026160, Mailing Date: Sep. 7, 2012.
International Preliminary Report on Patentability, PCT Application Number: PCT/US2011/026162, Mailing Date: Sep. 7, 2012.
International Preliminary Report on Patentability, PCT Application Number: PCT/US2011/026165, Mailing Date: Sep. 7, 2012.
International Search Report, PCT Application Number: PCT/US2011/026159, Mailing Dated: Nov. 30, 2011. (Nov. 30, 2011).
International Search Report, PCT Application Number: PCT/US2012/030448, Mailing Date: Oct. 19, 2012. (Oct. 19, 2012).
Kuboniwa, Akiko, et al. "IPsec-GW redundancy method with high reliability." Information and Telecommunication Technologies (APSITT), 2010 8th Asia-Pacific Symposium on. (pp. 1-5). IEEE, 2010.
Liang, Chieh-Jan Mike, et al. "Racnet: a high-fidelity data center sensing network," Proceedings of the 7th ACM Conference on Embedded Networked Sensor Systems. (pp. 15-28). ACM, 2009.
Non-Final Office Action for U.S. Appl. No. 13/034,732 (Feb. 14, 2013).
Non-Final Office Action for U.S. Appl. No. 13/034,733 (Feb. 28, 2013).
Non-Final Office Action for U.S. Appl. No. 13/034,733 (Apr. 9, 2014).
Non-Final Office Action for U.S. Appl. No. 13/034,736 (Dec. 19, 2012).
Non-Final Office Action for U.S. Appl. No. 13/034,736 (Jul. 29, 2015).
Non-Final Office Action for U.S. Appl. No. 13/944,801 (Apr. 27, 2015).
Non-Final Office Action for U.S. Appl. No. 11/174,248 (Jun. 26, 2008).
Non-Final Office Action for U.S. Appl. No. 11/835,228 (Jan. 14, 2010).
Non-Final Office Action for U.S. Appl. No. 12/714,404 (Apr. 2, 2012).
Non-Final Office Action for U.S. Appl. No. 12/839,373 (Jun. 7, 2012).
Non-Final Office Action for U.S. Appl. No. 12/839,373 (Apr. 1, 2013).
Non-Final Office Action for U.S. Appl. No. 13/036,842 (Oct. 17, 2012).
Non-Final Office Action for U.S. Appl. No. 13/036,842 (Feb. 12, 2013).

(56) References Cited

OTHER PUBLICATIONS

Non-Final Office Action for U.S. Appl. No. 13/230,760 (Oct. 4, 2012).
Non-Final Office Action for U.S. Appl. No. 13/034,730 (Mar. 13, 2014).
Non-Final Office Action for U.S. Appl. No. 13/070,086 (Jan. 25, 2013).
Non-Final Office Action for U.S. Appl. No. 13/034,730 (Dec. 6, 2012).
Non-Final Office Action for U.S. Appl. No. 13/944,795 (Jan. 16, 2015).
Non-Final Office Action for U.S. Appl. No. 13/944,795 (Sep. 9, 2016).
Notice of Allowability for U.S. Appl. No. 13/034,736 (Mar. 8, 2016).
Notice of Allowance and Fee(s) Due and Applicant-Initiated Interview Summary for U.S. Appl. No. 13/034,736 (Nov. 20, 2015).
Notice of Allowance and Fee(s) Due and Examiner Initiated Interview Summary for U.S. Appl. No. 13/042,135 (Dec. 31, 2012).
Notice of Allowance and Fee(s) Due for U.S. Appl. No. 13/230,760 (Mar. 21, 2013).
Notice of Allowance and Fee(s) Due for U.S. Appl. No. 13/036,842 (Jun. 10, 2013).
Notice of Allowance and Fee(s) Due for U.S. Appl. No. 13/944,801 (Nov. 23, 2016).
Notice of Allowance and Fee(s) Due for U.S. Appl. No. 13/944,801 (Jul. 1, 2016).
Notice of Allowance and Fee(s) Due for U.S. Appl. No. 13/944,801 (Jan. 21, 2016).
Notice of Allowance and Fee(s) Due for U.S. Appl. No. 13/034,732 (Jan. 17, 2014).
Notice of Allowance and Fee(s) Due for U.S. Appl. No. 13/034,733 (Dec. 24, 2014).
Supplemental Notice of Allowability for U.S. Appl. No. 13/034,733 (Feb. 17, 2015).
Notice of Allowance and Fee(s) Due in U.S. Appl. No. 11/965,668 (Mar. 10, 2010).
Notice of Allowance and Fee(s) Due in U.S. Appl. No. 12/705,195 (May 4, 2011).
Notice of Allowance and Fee(s) Due in U.S. Appl. No. 12/481,847 (Aug. 24, 2011).
Notice of Allowance and Fees Due and Examiner Initiated Interview Summary for U.S. Appl. No. 11/174,033 (Jul. 20, 2012).
Notice of Allowance and Fees Due and Examiner Initiated Interview Summary for U.S. Appl. No. 11/835,233 (Oct. 21, 2010).
Notice of Allowance and Fees Due for U.S. Appl. No. 11/223,477 (Dec. 17, 2008).
Notice of Allowance and Fees Due for U.S. Appl. No. 11/174,032 (Sep. 29, 2008).
Notice of Allowance and Fees Due for U.S. Appl. No. 11/174,238 (May 15, 2009).
Notice of Allowance and Fees Due for U.S. Appl. No. 11/174,248 (Oct. 20, 208).
Notice of Allowance and Fees Due for U.S. Appl. No. 11/370,487 (Oct. 1, 2009).
Supplemental Notice of Allowability for U.S. Appl. No. 11/370,487 (Nov. 10, 2009).
Notice of Allowance and Fees Due for U.S. Appl. No. 11/370,487 (Feb. 18, 2010).
Notice of Allowance and Fees Due for U.S. Appl. No. 11/370,487 (Mar. 10, 2010).
Supplemental Notice of Allowability for U.S. Appl. No. 11/370,487 (Mar. 26, 2010).
Notice of Allowance and Fees Due for U.S. Appl. No. 12/839,373 (Sep. 24, 2013).
Notice of Allowance and Fees Due for U.S. Appl. No. 11/835,228 (Oct. 20, 2010).
Supplemental Notice of Allowability for U.S. Appl. No. 11/925,626 (Jun. 30, 2010).
Notice of Allowance for U.S. Appl. No. 10/834,448 (Oct. 4, 2012).
Notice of Allowance for U.S. Appl. No. 13/034,730 (Jul. 30, 2014).
Notice of Allowance for U.S. Appl. No. 13/070,086 (Feb. 4, 2014).
Notification of Transmittal of the International Search Report and the Written Opinion of the International Searching Authority, or the Declaration for International Application No. PCT/US2011/026162 (Nov. 30, 2011).
Notification of Transmittal of the International Search Report and the Written Opinion of the International Searching Authority, or the Declaration for International Application No. PCT/US2011/026165 (Nov. 30, 2011).
Notification of Transmittal of the International Search Report and the Written Opinion of the International Searching Authority, or the Declaration for International Application No. PCT/US2011/026158 (Nov. 30, 2011).
Restriction Requirement for U.S. Appl. No. 11/174,033 (May 27, 2009).
Result of Consultation for European Patent Application No. 08 171 759.7 (Feb. 20, 2017).
Written Opinion, PCT Application No. PCT/US2011/026159, Mailing Dated: Nov. 30, 2011. (Nov. 30, 2011).
Written Opinion, PCT Application No. PCT/US2012/030448, Mailing Dated: Oct. 19, 2012. (Oct. 19, 2012).

\* cited by examiner

INTEGRATED SWITCH TAP ARRANGEMENT AND METHODS THEREOF

PRIORITY CLAIM

This application is a continuation application and claims priority under 35 U.S.C. §120 to a commonly assigned application entitled "Integrated Switch Tap Arrangement With Visual Display Arrangement And Methods Thereof," by Matityahu et al., application Ser. No. 12/481,847, filed on Jun. 10, 2009, now U.S. Pat. No. 8,094,576 which is a continuation-in-part and claims priority under 35 U.S.C. §120 to a commonly assigned patent application entitled "Methods and Arrangement for Utilization Rate Display," by Matityahu et al., application Ser. No. 11/835,233 filed on Aug. 7, 2007, now U.S. Pat. No. 7,903,576 all of which are incorporated herein by reference.

CROSS-RELATED APPLICATIONS

The present invention is related to the following applications, all of which are incorporated herein by reference:

Commonly assigned application entitled "Intelligent Communications Network Tap Port Aggregator," filed on Mar. 7, 2006 herewith by Matityahu et al. application Ser. No. 11/370,487.

BACKGROUND OF THE INVENTION

Telecommunication networks have long been employed to facilitate communication between users who are geographically dispersed. Communication may include transmission of data packets, such as data and voice packets, between a plurality of network devices, such as routers and switches. In today's business environment, a company's network may perform an important role in enabling a company to conduct its business. A company's network may have a plurality of routers and/or switches connected together. In a large company, the number of routers and/or switches may easily grow to a few hundreds. To manage the company's network in order to assure that the network is fully functionally, the information technology (IT) personnel may make sure that each router and/or switch is performing properly.

One conventional method for monitoring the network may include logging onto the network system in order to extract statistical data about the performance of each router and/or switch. A less manual method may include employing monitoring tools to extract the statistical data and to employ an analytical application program to analyze the statistical data. Even so, the statistical data is not readily available and the IT (information technology) personnel may still be required to log onto the network system and/or router/switch in order to access this information.

In addition, the statistical data that IT personnel, such as a technician, may need in order to perform his task of maintaining and monitoring the health of the network system may not always be accessible to the IT personnel. In a typical network environment, certain servers may include highly sensitive information. As a result, not everyone in the IT department may have access to every aspect of the network. As a result, to access the statistical data, authorization may be required.

BRIEF SUMMARY OF THE INVENTION

The invention relates, in an embodiment, to an arrangement in a network device for monitoring network traffic. The arrangement includes a set of network ports, which includes a set of input network ports for receiving the network traffic and a set of output network ports for outputting the network traffic from the network device. The arrangement also includes a switch chip, wherein the switch chip is configured at least for analyzing the network traffic. The arrangement further includes a set of monitoring ports, which is configured to receive the network traffic from the set of network ports. The arrangement yet also includes a tap module, which is configured at least for intercepting at least part of the network traffic flowing through the network device and forwarding at least part of the network traffic to at least one of the set of monitoring ports.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

As aforementioned, a network may include a plurality of network devices. Each network device may store statistical data about the data traffic (e.g., data, media, voice, etc.) that may flow through the device. To monitor the activities on the network, a monitoring system may be employed.

Figure 1:
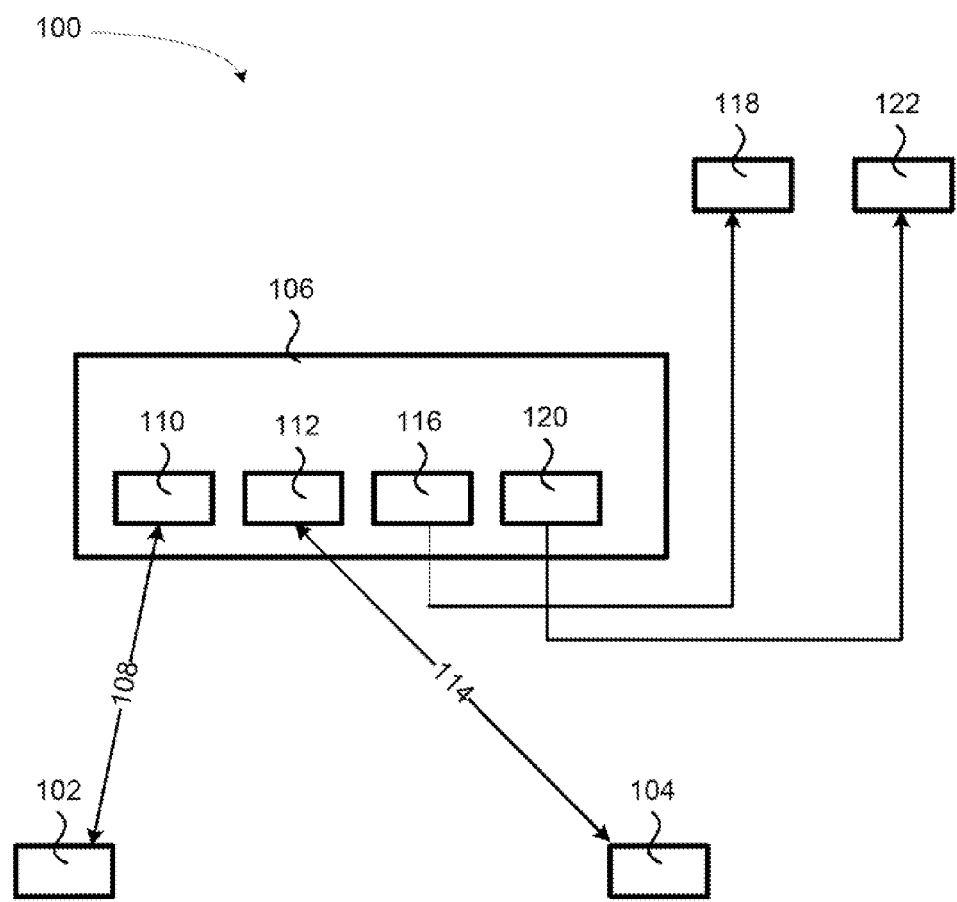
FIG. 1 shows a simple network diagram with a network tap.

To facilitate discussion, prior art FIG. 1 shows a simple network diagram with a network tap. As discussed herein, a network tap is an example of a network device that may be employed to monitor the activities on a network link. A network arrangement 100 may include a set of network devices, such as an Ethernet switch 102 and an Ethernet router 104, to facilitate the transmission of the stream of data packets. Network arrangement 100 may also include a network tap 106, which may sit in-line on a network link (as shown by paths 108 and 114) between the two network devices (Ethernet switch 102 and Ethernet router 104). In an example, stream of data packets may flow from Ethernet switch 102 upstream along path 108 to a port 110 over to a port 112 and out to Ethernet router 104 via path 114. Similarly, data from Ethernet router 104 may flow upstream along path 114 to port 112 through port 110 down path 108 to Ethernet switch 102.

Network tap 106 may act as a bridge between Ethernet switch 102 and Ethernet router 104. By employing network tap 106, monitoring of the data traffic between Ethernet switch 102 and Ethernet router 104 may be monitored. Network tap 106 may be a dual ports monitoring arrangement. In an example, the stream of data packets received by port 110 may be copied and forwarded through a port 116 to a monitoring device 118. Similarly, the stream of data packets received by port 112 may be copied and forwarded through a port 120 to a monitoring device 122. Examples of monitoring device may be a PC, an intrusion detection system, a network analyzer, an intrusion prevention system, and the like.

Figure 2:
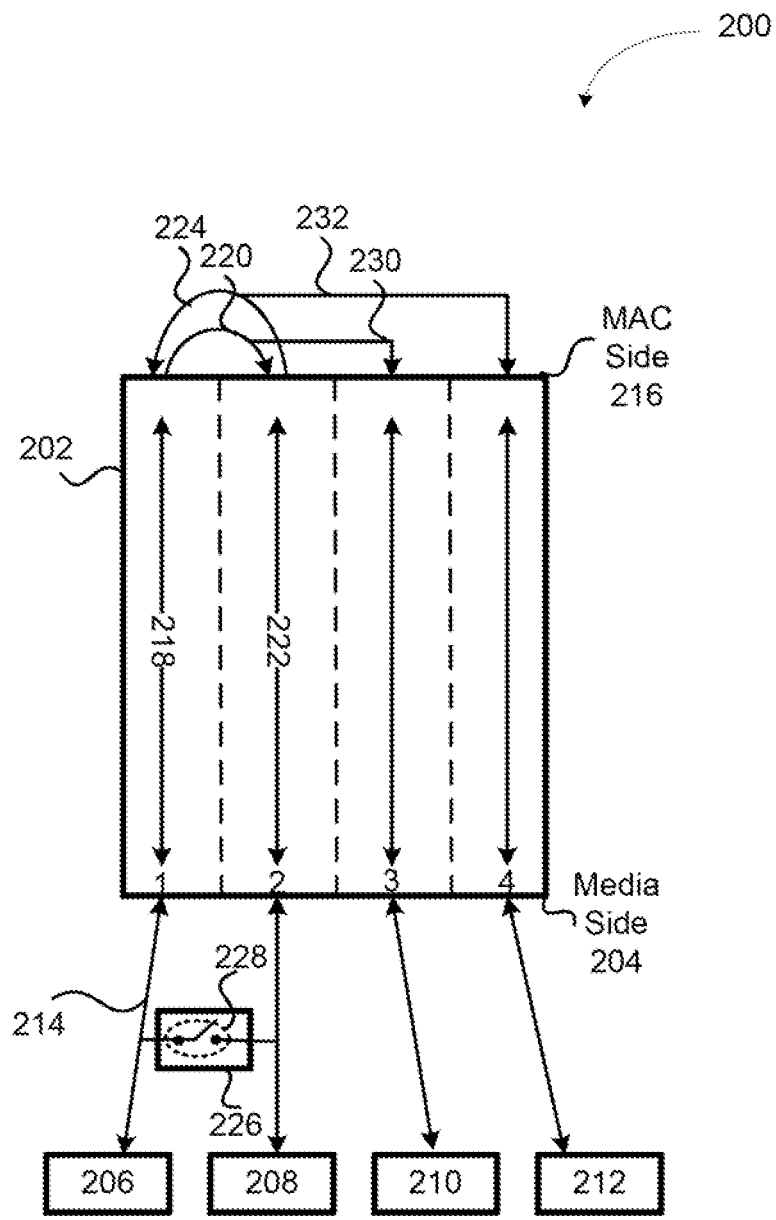
FIG. 2 shows a schematic of a network tap.

To understand how a network tap may function, prior art FIG. 2 shows a schematic of a network tap. Network tap 200 may include a PHY (physical interface layer) chip 202, which may be an Ethernet transceiver. As discussed herein, a PHY chip refers to a chip that may be employed to receive and transmit signals, which may include data packets. A media side 204 of PHY chip 202 may enable PHY chip 202 to connect with the physical ports (206, 208, 210, and 212) of network tap 200. In an example, stream of data packets may be received at a port 206 and transmitted along a line 214 to PHY chip 202. The stream of data packets is usually received as an analog signal.

The stream of data packets from port 206 may travel through PHY chip 202 along path 218 out on a media access controller (MAC) side 216 of PHY chip 202. PHY chip 202 may be employed to convert the analog signal to a digital signal before sending the signal out on MAC side 216. The stream of data packets may loop back via a bus line 220 through PHY chip 202 to travel to port 208 via a path 222. Similarly, a bus line 224 may be employed to loop stream of data packets traveling from port 208 to port 206. In an example, the bus line that may be employed to loop data between the ports may be a reduced gigabit media independent interface (RGMII).

Network tap 200 may also include a passive circuit 226. Passive circuit 226 may include a switch 228 that may close to create a bypass route between port 206 and port 208 when power is not available.

For monitoring purposes, the stream of data packets received may be copied and sent to monitoring devices on port 210 and port 212. In an example, stream of data packets received by port 206 may be sent through PHY chip 202. PHY chip 202 may convert the stream of data packet from analog to digital before sending the stream of data packets out on MAC side 216. A copy of the digital stream of data packets may be sent along a line 230 back through PHY chip 202 to monitor port 210. Note that as the digital stream of data packets travels through PHY chip 202, PHY chip 202 may convert the stream of data packets back to an analog signal. Similarly, stream of data packets received by port 208 may be sent to a port 212 via a line 232.

As can be appreciated from the foregoing, monitoring systems, such as the one described in FIGS. 1 and 2 may collect a plurality of statistical data about a company's network. However, the statistical data is not readily available. In an example, to retrieve the statistical data, IT personnel may have to log onto the system in order to access the data.

In one aspect of the invention, the inventors herein realizes that the time IT personnel may spend on retrieving the statistical data in order for the IT staff to perform maintenance and monitoring may be substantially minimized if the network data is readily available. It is desirable therefore to provide a convenient method for accessing network data, especially the utilization rate of a port. The inventors herein realized that if the data is visually displayed, the IT personnel may quickly access the health of each component of the network without being required to log onto the system to retrieve the information. Further, by visually displaying the information, IT personnel may be able to support network devices that may be associated with highly sensitive information without being required to acquire authorization to access the server that may hold the highly sensitive information.

In accordance with embodiments of the invention, a network device with a visual performance display arrangement is provided. Embodiments of the invention also include methods for calculating and displaying a utilization rate for a network port. As discussed herein, a utilization rate refers to the actual throughput of a network port.

In this document, various implementations may be discussed using utilization rate as an example. This invention, however, is not limited to utilization rate and may include any network parameters. Instead, the discussions are meant as examples and the invention is not limited by the examples presented.

Also, in this document, various implementations may discuss using a dual port network tap as an example. This invention, however, is not limited to a dual port network tap and may include other network devices, such as a port aggregation tap, a bypass switch, a regeneration tap, a matrix switch, and the like. Instead, the discussions are meant as examples and the invention is not limited by the examples presented.

In an embodiment of the invention, a network device with a visual performance display arrangement may be provided for displaying vital network parameters. Examples of network parameters may include, but are not limited to, real-time utilization rate of network capacity, average utilization rate, highest peak of traffic peaks, traffic types, fault conditions, and the like. In an embodiment, network parameters for each port may be displayed. The network parameters may be displayed in text and/or graphically. As can be appreciated from the foregoing, the network parameters may be visually available without requiring IT personnel to log in to retrieve the data, thereby increasing the efficiency of the IT personnel and decreasing response time for handling network anomalies.

As can be appreciated from the foregoing, a plurality of network parameters may be available. In an embodiment of the invention, a logic arrangement (e.g., such as an FPGA (field-programmable gate array), an application-specific integrated circuit (ASIC), complex programmable logic device (CPLD), and the like) may be employed to analyze the network parameters and to generate the statistical data. As can be appreciated from the foregoing, the logic arrangement that may be employed to perform the analysis and to calculate the statistical data may vary depending upon the manufacturing preference. In an example, the logic arrangement may include a single programmable component (such as a FPGA). In another example, the logic arrangement may be a set of programmable components (such as a set of FPGAs), with each programmable component being configured to perform different function. In yet another example, the logic arrangement may include a set of programmable components (such as a set of FPGAs) and a set of programmable digital electronic component (such as a set of microprocessors).

A network parameter that is commonly employed to quickly determine the status of a port is a utilization rate. To determine the utilization rate, the logic arrangement may be configured to include a set of counters for each port. In an embodiment, a first counter may be employed to keep track of each instance of a valid data packet received by a port. The data for valid data packet may be extracted from an RX_DV signal of an RGMII bus that is connected to the MAC side of a PHY. RX_DV is a control signal that may indicate a valid data packet being received by a port. In an example, when a valid data packet is received, the RX_DV signal may be asserted (i.e. go high) and the RX_DV signal may go low when the transmission has been completed. Thus, the logic arrangement may be able to identify the valid data time period by analyzing the RX_DV signal.

In an embodiment, a second counter may be employed to keep track of the number of bytes being received. The byte data may be extracted from an RX_CLK signal of an RGMII bus. In an embodiment, for a gigabits Ethernet device, the RX_CLK signal is a 125 megahertz clock that employs a double rate transmission. In other words, for each clock cycle (up and down), two bytes are being received.

To identify the number of bytes that may be received during a valid data time period, the logic arrangement may correlate the RX_DV signal with the RX_CLK signal. With the number of bytes, the logic arrangement may then convert the data from bytes to bits information. In other word, if 7 bytes are received for a valid data packet, the logic arrangement may convert the bytes into bits by multiplying the number of bytes received by 8, thereby getting 56 bits.

In addition, the logic arrangement may normalize the data. In an example, a monitor cycle may be every one second but the data collected by the counter may be collected at every 1/10 of a second. In the above example, the 56 bits may be normalized to be 560 bits per second. The normalized data may indicate the amount of data that is actually being received by a port. To determine the utilization rate, the logic arrangement may divide the actual rate of data received by the line rate a network device is capable of carrying. In this example, for a one-gigabits Ethernet device, which is capable of transmitting up to 1 gigabits of data, to only be receiving data at 560 bits per second may be a cause for concern. By displaying the utilization rate for easy viewing, the IT personnel may be able to promptly address the problem.

The features and advantages of the present invention may be better understood with reference to the figures and discussions that follow.

Figure 3A:
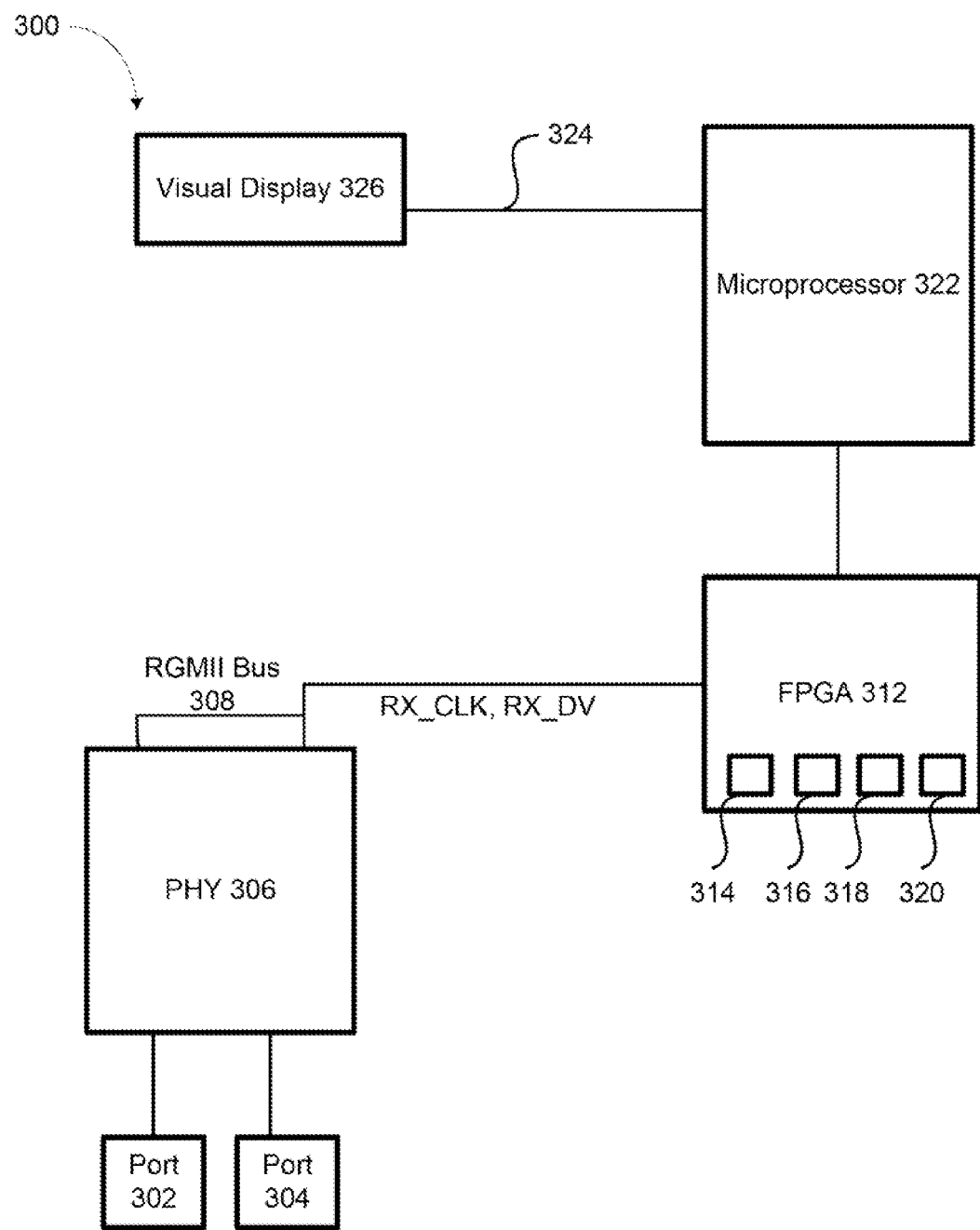
FIG. 3A, shows in an embodiment of the invention, a simple block diagram of a network tap with a visual performance display arrangement.

FIG. 3A shows, in an embodiment of the invention, a simple block diagram of a network tap with a visual performance display arrangement.

A network tap 300 may include port 302 and port 304. As aforementioned, network tap may be employed to monitor the data traffic of a network. As can be appreciated, network tap is able to perform its monitoring function without interfering with the normal data traffic. In other words, data traffic may flow between ports 302 and 304 without interruption irrespective whether power is available to power-up the circuitry of network tap 300. In an example, data traffic may flow into port 302 to an Ethernet transceiver, such as PHY 306, and out through port 304. Thus, data traffic may continue to flow between the ports whether or not network tap 300 is performing its monitoring function.

Figure 3B:
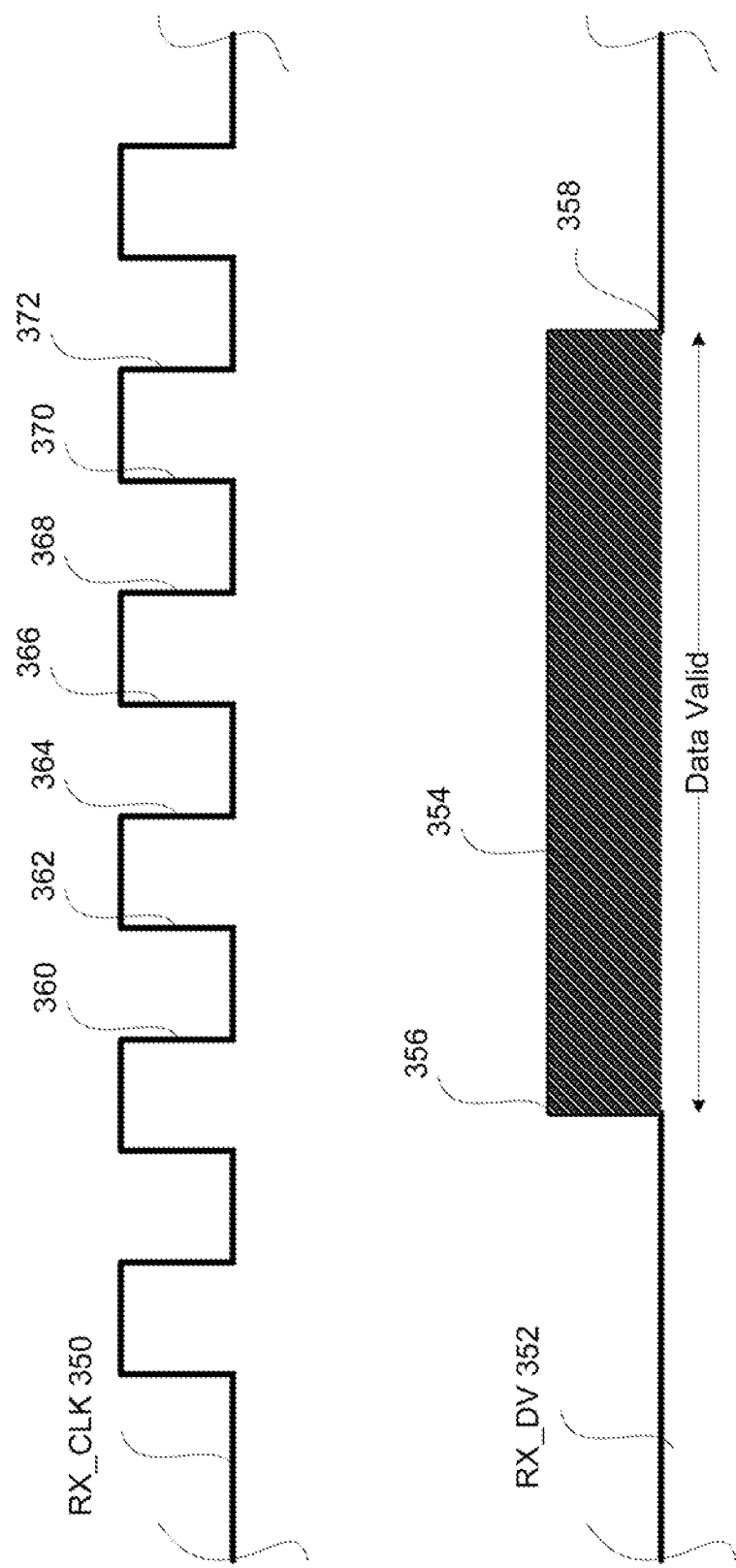
FIG. 3B, shows in an embodiment of the invention, a simple diagram of a RX_CLK and a RX_DV signals.

However, if power is available to enable network tap 300 to perform its monitoring function, the same data traffic which may flow into port 302 and is received by PHY 306 may be copied. In an embodiment, a bus, such as an RGMII bus 308, may be configured to direct the copy of the data traffic to the monitor devices. Those skilled in the art are aware that RGMII bus 308 may include a plurality of signals, including, but are not limited to, RX_CLK, RX_DV, GTX_CLK, TX_EN, RXD[3:0], and TXD[3:0]. In an embodiment, two signals, such as an RX_CLK signal 350 and an RX_DV signal 352 (as shown in FIG. 3B), may be extracted from RGMII bus 308 and be sent along a path to a logic arrangement, such as a field-programmable gate array (FPGA) 312. FPGA 312 may include intelligence for determining when data is valid on RGMII bus 308 based on the two signals (RX_CLK and RX_DV).

FPGA 312 may include 2 counters for each port (counter 314, counter 316, counter 318, and counter 320). In an embodiment, counter 314 may be associated with RX_DV signal 352 and may be incremented for each occurrence of valid data. In an example, when a data packet is received by port 302, counter 314 may increase by one.

In another embodiment, counter 316 may be associated with RX_CLK signal 350 and may be incremented for each byte received. FPGA 312 may employ RX_CLK signal 350 as the clock for measuring the number of bytes that may be received during a valid data time period. RX_CLK signal 350 is a 125 megahertz clock for a 1 gigabytes Ethernet. Since the RX_CLK signal 350 may be a control signal from RGMII bus 308, two bytes are assumed to be received in each clock cycle. In other words for each lowering or rising edge (360, 362, 364, 366, 368, 370, and 372), a byte is received.

In order to determine the number of bytes received during a valid data time period, FPGA 312 may combine the two control signals.

In an example, when a data packet is received by a port, RX_DV signal 352 may be asserted (i.e., go high). In other words, when RX_DV signal 352 is high (as shown by shaded section 354) a valid data packet has been received. In an embodiment, the time period between rising edge 356 and lowering edge 358 may indicate the valid data time period.

Although RX_DV signal 352 may be employed to indicate when data is valid, RX_DV signal 352 does not provide information about the byte size of the incoming data packet. Since the number of bytes per packet is unknown, RX_CLK signal 350 may be employed to determine the number of bytes in a valid data packet. Those skilled in the arts are aware that for a RGMII bus, data is sent out for each falling clock and each lowering clock of the 125 megahertz clock. Thus, by counting the number of rising and lower edges (360, 362, 364, 366, 368, 370, and 372) of RX_CLK signal 350 when RX_DV signal 352 is asserted, the number of bytes for each valid data time period may be determined.

Once the counters in FPGA 312 have collected the data and have correlated the two signals to determine the valid number of bytes for each valid data time period, the utilization rate may be determine. In an embodiment, the logic arrangement may include one or more programmable component. In an example, the same FPGA 312 may perform the analysis. In another example, FPGA 312 may forward the data collected to another programmable component in the logic arrangement, such as a microprocessor 322, to determine the utilization rate. As can be appreciated from the foregoing, the calculation of the utilization rate may depend upon the network device that may have been employed. In an example, for a 1 gigabits Ethernet, the number of bytes collected during a valid data time period may have to be divided by a gigabits to determine the actual utilization rate.

Once the utilization rate has been determined, the utilization rate may be forwarded along a path 324 to be display on a visual display 326 of network tap 300, in an embodiment. As can be appreciated from the foregoing, besides being displayed, the utilization rate may also be distributed by other methods, such as sending the statistical data as a report to a remote user or forwarding the data to an application program for analysis. Also, as can be appreciated from the foregoing, since the data may be remotely accessible, monitoring may be performed offsite, enabling the IT personnel more flexibility in performing their task of keeping the network fully functional.

As can be seen from FIGS. 3A and 3B, by extracting the relevant control signals from the bus line, the logic arrangement, such as the FPGA and the microprocessor, may be able to calculate the utilization rate of a network port. By displaying the utilization rate, IT personnel may be able to easily view the data without having to log onto the network system to retrieve the data. Besides displaying real-time data, the visual performance display arrangement may also display historical trend, such as the greatest traffic peak, to aid the IT personnel with maintaining and monitoring the network. As can be appreciated from the foregoing, by making the data visually available, the need for authorization code to access network devices associated with highly sensitive information may be substantially eliminated. Thus, low-level IT personnel may perform their job without the company having to be concerned about unauthorized users gaining access to confidential information.

Figure 4:
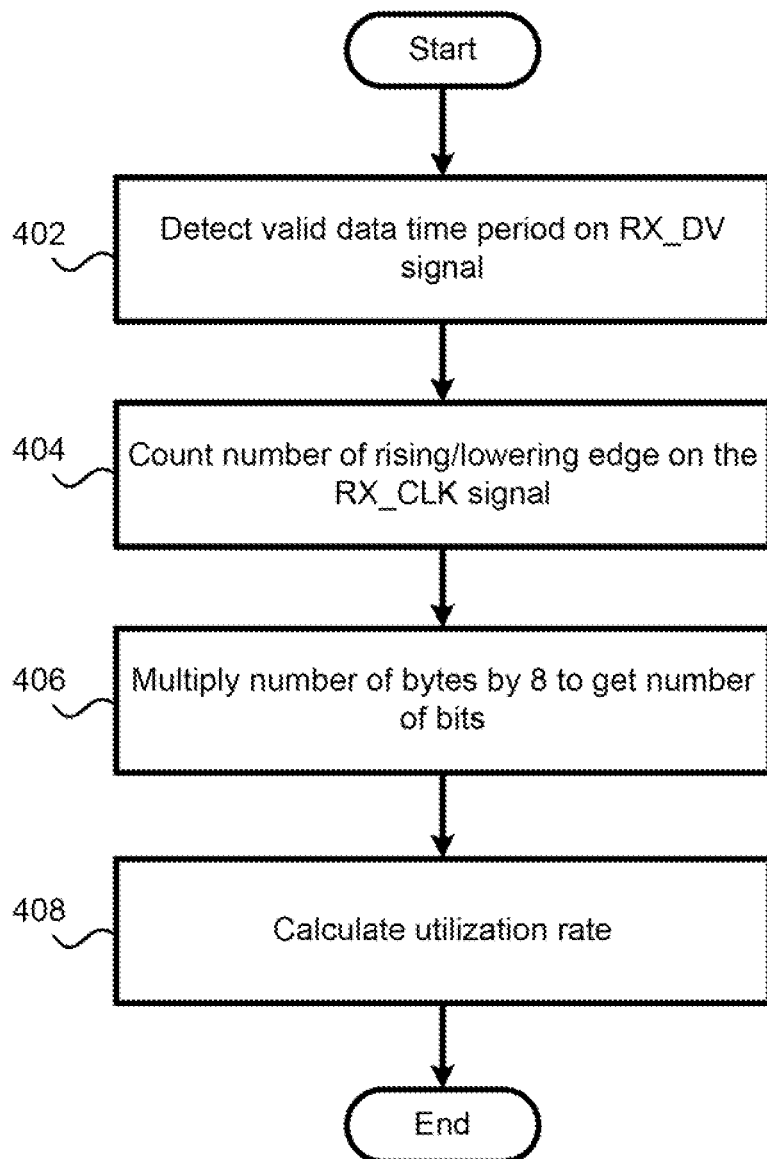
FIG. 4 shows, in an embodiment of the invention, a simple flow chart illustrating a methodology for calculating the utilization rate.

FIG. 4 shows, in an embodiment of the invention, a simple flow chart illustrating a methodology for calculating the utilization rate. FIG. 4 will be discussed in relation to FIGS. 3A and 3B to provide an illustration of how the steps may be implemented. Consider the situation wherein, for example, a valid data packet has been received by port 302.

At a first step 402, a logic arrangement may detect valid data time period on a RX_DV signal. In an example, FPGA 312 may analyze RX_DV signal 352 to determine rising edge 356 that may indicate the beginning of valid data time period 354. As aforementioned, only one data packet is received during each valid data time period. Thus, counter 314 may increase by one to indicate the new valid data time period.

At a next step 404, the logic arrangement may count the number of rising and lowering edges on a RX_CLK signal. To determine which section of RX_CLK signal to count, FPGA 312 may correlate RX_CLK signal 350 against RX_DV signal 352 to determine the number of rising and lowering edges. In an example, during valid data time period 354, seven bytes may have been collected based on the rising and lowering edges (360, 362, 364, 366, 368, 370, and 372) of RX_CLK signal 350.

At a next step 406, the number of bytes is converted into the number of bits. Once FPGA 312 has determined the number of bytes collected, FPGA 312 may forward the data to microprocessor 322. Since the network device is a gigabits Ethernet device, microprocessor 322 may first convert the number of bytes to the number of bits. Those skilled in the arts are aware that 8 bits are in each byte. Thus, the number of valid bits in valid data time period 354 may be 56 bits (e.g., 7 bytes×8 bits).

At a next step 408, the utilization rate may be calculated. Before calculating the utilization rate, microprocessor 322 may normalize the data. In an example, 56 bits have been transmitted for each 1/10 of a second. However, a collection cycle may be occurring every one second. Thus, in every one second 560 bits per second may be transmitted.

Once the data has been normalized, the logic arrangement may calculate the utilization rate. Utilization rate may be calculated by dividing the actual number of bits per second into the number of bits per second a line may be capable of carrying. In this example, since the network device is a one gigabits Ethernet device, the microprocessor may divide the normalized number into one gigabits to determine the utilization rate.

As can be appreciated from the foregoing, the same procedure described in FIG. 4 may also be applied to other bus lines, such as a GMII, that may also have control signals, such as RX_DV and RX_CLK, from which utilization rate may be calculated.

Figure 5:
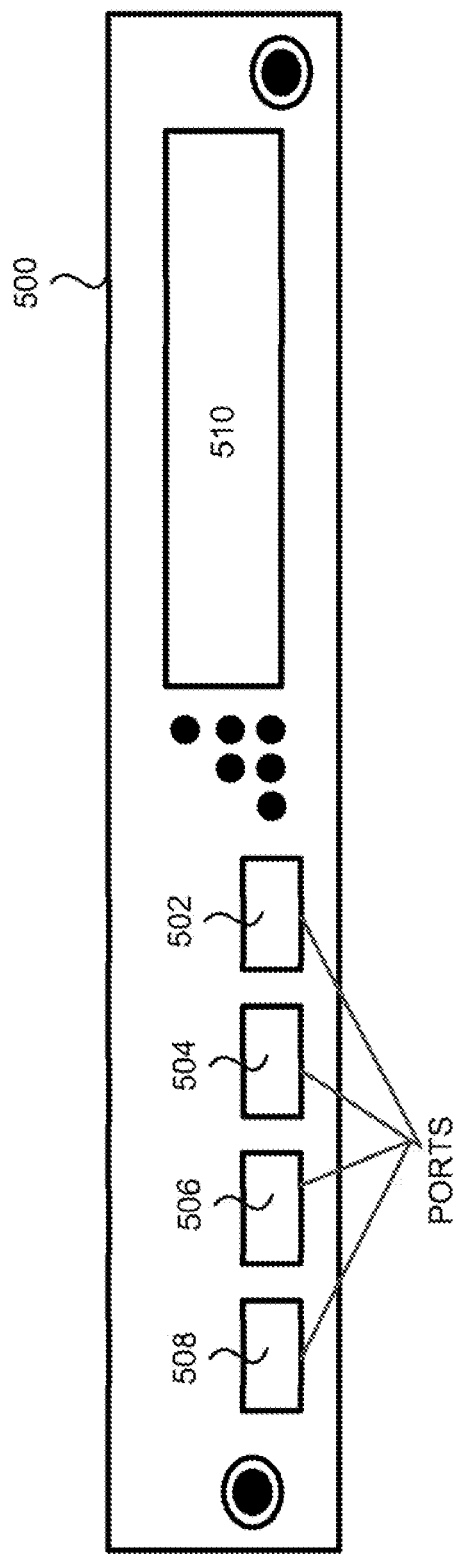
FIG. 5 shows, in an embodiment of the invention, an example of a network device with a visual performance display arrangement.

FIG. 5 shows, in an embodiment of the invention, an example of a network device with a visual performance display arrangement. A network device 500 may include a plurality of ports. In this example, network device 500 may include two network ports (502 and 504) and two monitoring ports (506 and 508). As can be appreciated from the foregoing, the network device may be any device that is capable of directing Ethernet traffic. Thus, network device 500 may be a router, a switch, a network tap, and the like.

A visual display arrangement 510 may also be coupled to network device 500. In an example, visual display arrangement may be an LCD (liquid crystal display) screen. As can be appreciated from the foregoing, the size of the visual display arrangement may be dependent upon a manufacturer's configuration preference. In an example, the size of the LCD screen may depend upon the size of the network device.

As can be appreciated from the foregoing, the network parameters that may be displayed on visual display arrangement may be data that may aid IT personnel in performing their task of maintaining and monitoring a company's network. Although utilization rates have been utilized as examples for implementing a network device with a visual performance display arrangement, other network data parameters may also be shown. Examples of type of technical and diagnostic data that is displayed may include, but are not limited to, real-time utilization level for each path of a network link, size and time of the greatest traffic peaks, SNMP traps for system/link/power, average percent utilization of network capacity, counters for total packets, total bytes, and the like.

In an embodiment, network data may be updated periodically to visually display the real-time data. In another embodiment, the data parameters that may be displayed may be cycled. In other words, the amount of data parameters that may be viewed may be limited to the visual display arrangement. To enable the different data parameters to be viewed, different methods may be employed to determine when the network data may be cycled. In an example, data parameters may be displayed for a pre-set time period. In another example, a control component, such as a button or a rolling wheel, may be utilized to enable the IT personnel to select the desired data parameters.

As can be appreciated from the foregoing, the mode in which the data parameters may be displayed may vary. In an example, the network data may be shown as text. In another example, the network data may be shown graphically (e.g., charts, bar graphs, etc.).

As can be appreciated from the foregoing, one or more embodiments of the present invention provide for methods and apparatuses for displaying network parameters on a network device. By visually displaying the network parameters, instantaneous network data parameters may be readily available to the IT personnel at the network device. Thus, efficiency may increase and cost may decrease by making the network data parameters visually accessible.

In an interconnected environment, such as an enterprise network or even the Internet, millions of data packets are being exchanged daily. To facilitate the exchange of data packets through a network, a network device, such as a Layer 2 or Layer 3 network switch, may be employed. Typically, a network switch is a high-density device that is capable of directing a plethora of network traffic. Since a high volume of network traffic may flow through a single network switch, the ability to monitor the network traffic may provide an administrator with a tool for managing the health of a network, such as ensuring reliable performance, enabling fault detection, and detecting unauthorized activities.

Figure 6:
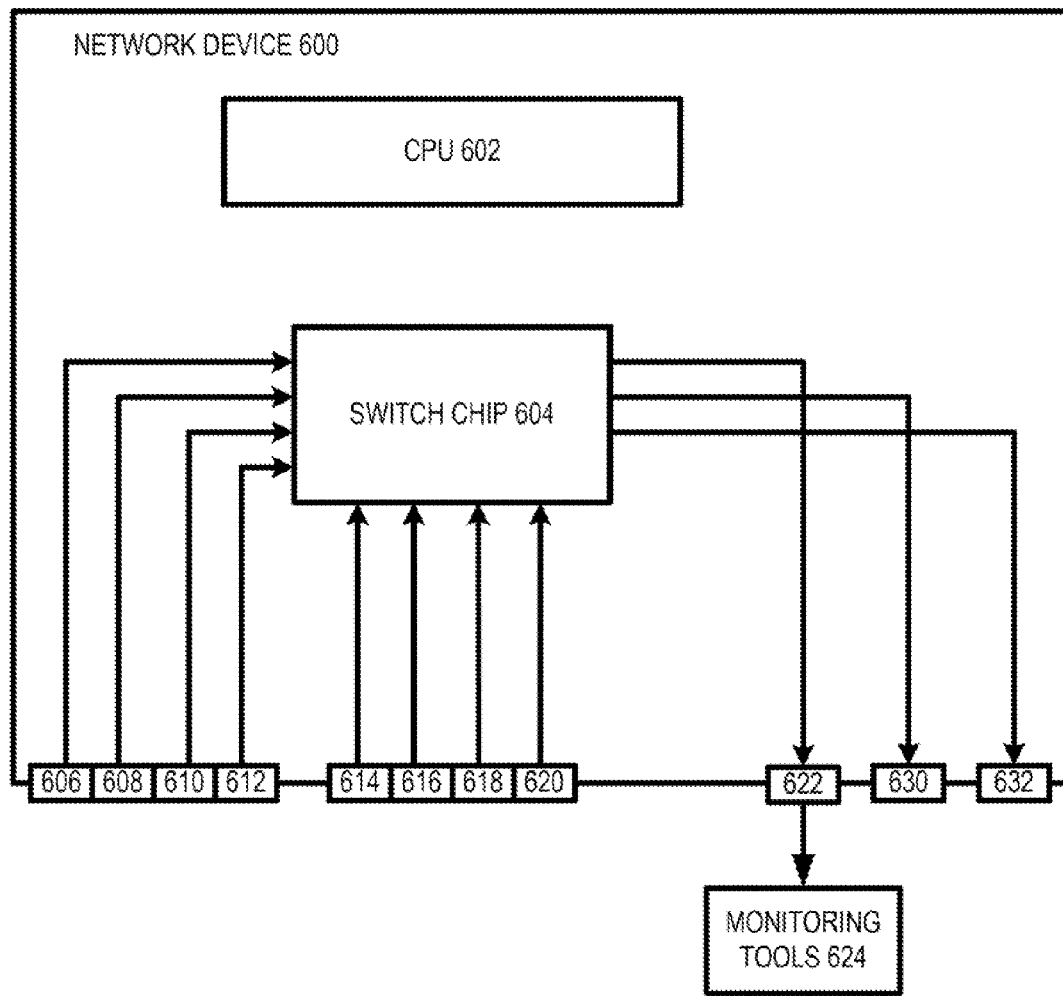
FIG. 6 shows a simple block diagram of a switch device with mirroring functionality.

One arrangement that has been implemented to enable monitoring includes the usage of a mirror port. As discussed, herein, a mirror port refers to a port that has been configured to receive a copy of the network traffic from a plurality of source ports. To facilitate discussion, FIG. 6 shows a simple block diagram of a switch device with mirroring functionality. A network switch 600 may include a plurality of source ports (606, 608, 610, 612, 614, 616, 618, and 620), which are configured for receiving data packets, determining the destination, and forwarding the data packets. In an example, a data packet may be received by source port 606. The data packet is analyzed by a switch chip 604, which may determine that the data packet is to be forwarded to its destination via an uplink port (e.g., 630, 632, etc.).

Network switch 600 may also include a mirror port 622, which may be linked to a monitoring tool 624, such as a computer system. In an example, data packets received by switch chip 604 may be copied and forwarded to monitoring tool 624 via mirror port 622. Since data traffic from a plurality of source ports are flowing into a single mirror port (622), network traffic congestion may occur. To relieve network traffic congestion to mirror port 622, switch chip 604 may have a built-in filtering functionality.

In an example, a data packet of one gigabyte may be received by source port 606. However, about 0.30 gigabyte of the data packet may include error. Before copying the data packet, switch chip 604 may filter the data packet and remove the portion of the data packet that may include the error. Accordingly, only a portion of the data packet is being forwarded to mirror port 622. Thus, the data traffic that is visible to monitoring tool 624 is limited to the network traffic that is copied and forwarded via mirror port 622. Since the error portion of the data packet has been filtered out, the error portion is not available for analysis.

However, even by filtering out the error portion of a data packet, network traffic congestion may still continue to be a problem. Hence, switch chip 604 may have to drop additional data packets in order to minimize and/or prevent network traffic congestion. Therefore, the ability for monitoring tool 624 to perform its monitoring is dependent upon the network switch.

To enable switch chip 604 to perform the mirror functionality, a significant amount of processing may be required. In some circumstances, up to 20-30 percent of a CPU 602 processing power may be utilized by switch chip 604 to perform the mirroring functionality. Since the mirroring functionality is considered as a non-critical function for network switch 600, the mirroring functionality may be one of the first functionality that may be turned off when CPU 602 is overloaded in order to enable network switch 600 to perform its main function of routing network traffic. Consequently, the loss of the mirroring functionality may eliminate the ability for an administrator to monitor the network traffic since no copy of the network traffic is being forwarded to monitoring tool 624 via mirror port 622.

Figure 7:
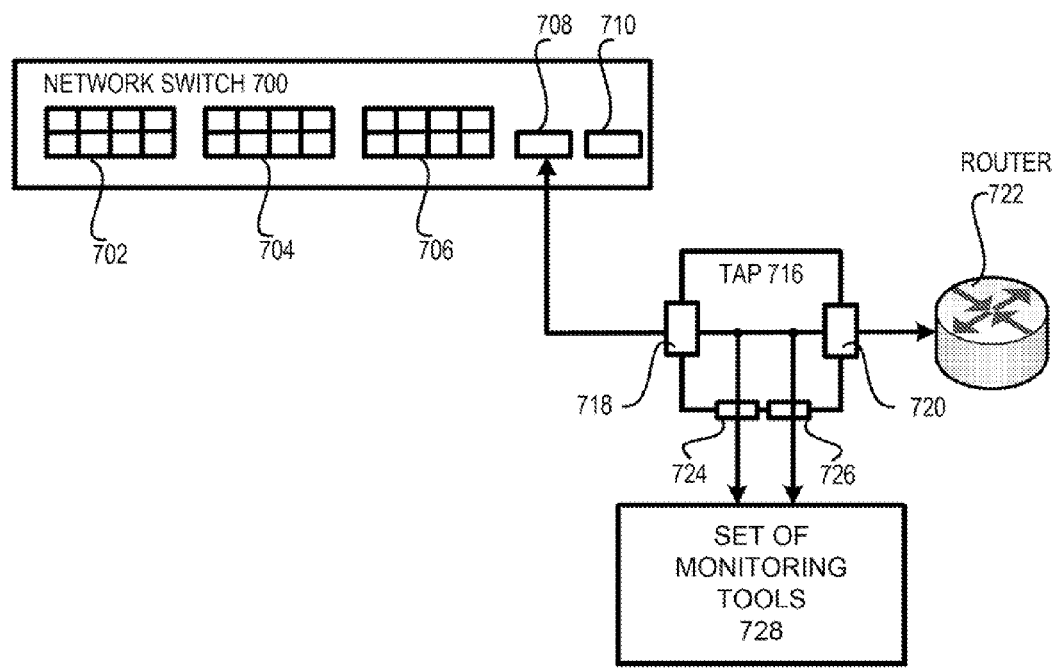
FIG. 7 shows a simple block diagram of a network switch with an external in-line tap arrangement.

An alternative prior art solution for monitoring network traffic, especially for a network switch without mirroring functionality, is to attach an external network tap as an in-line device to a network switch. FIG. 7 shows a simple block diagram of a network switch with an external in-line tap arrangement. A network switch 700 may include a plurality of source ports (702, 704, 706, etc.), which are configured for receiving data packets, determining the destination, and forwarding the data packets. In an example, network traffic may flow into a source port 702 and out one of the uplink ports (708, 710).

In order to monitor the traffic, an external in-line tap, such as a tap 716, may be connected to uplink port 708 in order to monitor the data traffic that is flowing out of uplink port 708 to a router 722, for example. Tap 716 may include two network ports (718 and 720), which are configured for receiving and forwarding network traffic. In an example, network port 718 is configured for receiving data packets from uplink port 708 and for sending data packets to uplink port 708. Similarly network port 720 is configured for receiving/sending data packets from/to router 722. The network traffic that flows through tap 716 is copied and forwarded to set of monitoring tools 728 via a monitor port (such as 724 or 726). In an example, network traffic is received by source port 702. The network traffic is forwarded to a switch chip (not shown). In this network switch arrangement, the switch chip may not have mirroring functionality. Thus, the network traffic that is received by the switch chip is ultimately sent out via one of the uplink ports.

The network traffic flowing through tap 716 is bidirectional. In other words, tap 716 may be receiving network traffic from both network switch 700 and router 722. As a result, the amount of data that may flow through tap 716 may cause traffic congestion when the data packet is duplicated and forwarded to the monitoring ports. Due to traffic congestion, data packets may be dropped until the traffic congestion has been alleviated.

As can be appreciated from FIG. 7, the network switch with an external in-line tap arrangement requires multiple network devices to be interconnected. Since the network devices may be of different makes and models, the setup and the maintenance of the network may become quite complex. Additionally, more physical space is required in order to accommodate the network switch with the external tap arrangement.

There are several disadvantages to the prior art monitoring arrangements for a network switch device. For a network switch with a mirror port, users are provided with little or no control over the type of data packets that are visible to the users. Instead, the network switch may have built-in logic that defines the rules for dropping a data packet. In addition, the mirroring functionality is resource intensive and may cause the CPU of the network switch to be overloaded. Since the mirroring functionality is a secondary function of the network switch, the mirroring functionality may be turn off to preserve the primary function (directing network traffic) of the network switch, thereby terminating the traffic flow to the monitoring devices.

In the second monitoring arrangement, a network switch with an external in-line tap provides a monitoring arrangement that is not susceptible to being turn off when the processor of the network switch is overloaded. However, the tap monitoring arrangement may still experience loss of data due to network traffic congestion. In addition, the tap monitoring arrangement requires more physical space since the tap monitoring arrangement may require more network devices to perform the same monitoring function as the network switch with mirroring functionality. Also, the external in-line tap arrangement may result in higher power consumption. Given that this arrangement is a disjointed solution, the configuration and maintenance of the external tap arrangement may also require more resources.

In accordance with embodiments of the invention, an integrated switch tap arrangement is provided for enabling monitoring of network traffic within a single device. Embodiments of the invention include integrating a tap module within a switch device to perform monitoring functionalities. The tap module may be configured to intercept data traffic flowing to a set of uplink ports. The intercepted data may be copied and forwarded to a set of monitoring ports.

In an embodiment of the invention, tap module may include filtering logic. Unlike the prior art, the filtering logic may be user-configurable, thereby enabling a user to determine the type of data packets that may be monitored. Additionally or alternatively, the filtering logic may also enable the user to define the type of data packets that a monitoring tool may receive.

In an embodiment, the integrated switch tap arrangement may include two CPUs. The primary CPU being utilized to perform functions usually associated with a traditional network switch. A secondary CPU may be reserved for processing the tasks the tap module may perform, such as executing the filtering logic. With a secondary CPU, the possibility of losing visibility of the network traffic is substantially eliminated since the monitoring and filtering functions have been separated from the routing function.

In another embodiment, the integrated switch tap arrangement may include a buffering component. Since network traffic is bidirectional (flowing into and out of uplink ports), the volume of network traffic that may be forwarded to a set of monitoring ports may be larger than the volume that the set of monitoring ports is capable of handling. To handle the potential network traffic congestion to the set of monitoring ports, a buffer component may be positioned between the tap module and the set of monitoring ports, thereby enabling the buffer component to buffer the network traffic when network traffic congestion may occur. Thus, with a buffer component, the risk of dropped data packets may be substantially reduced and/or minimized.

The features and advantages of the present invention may be better understood with reference to the figures and discussions that follow.

Figure 8:
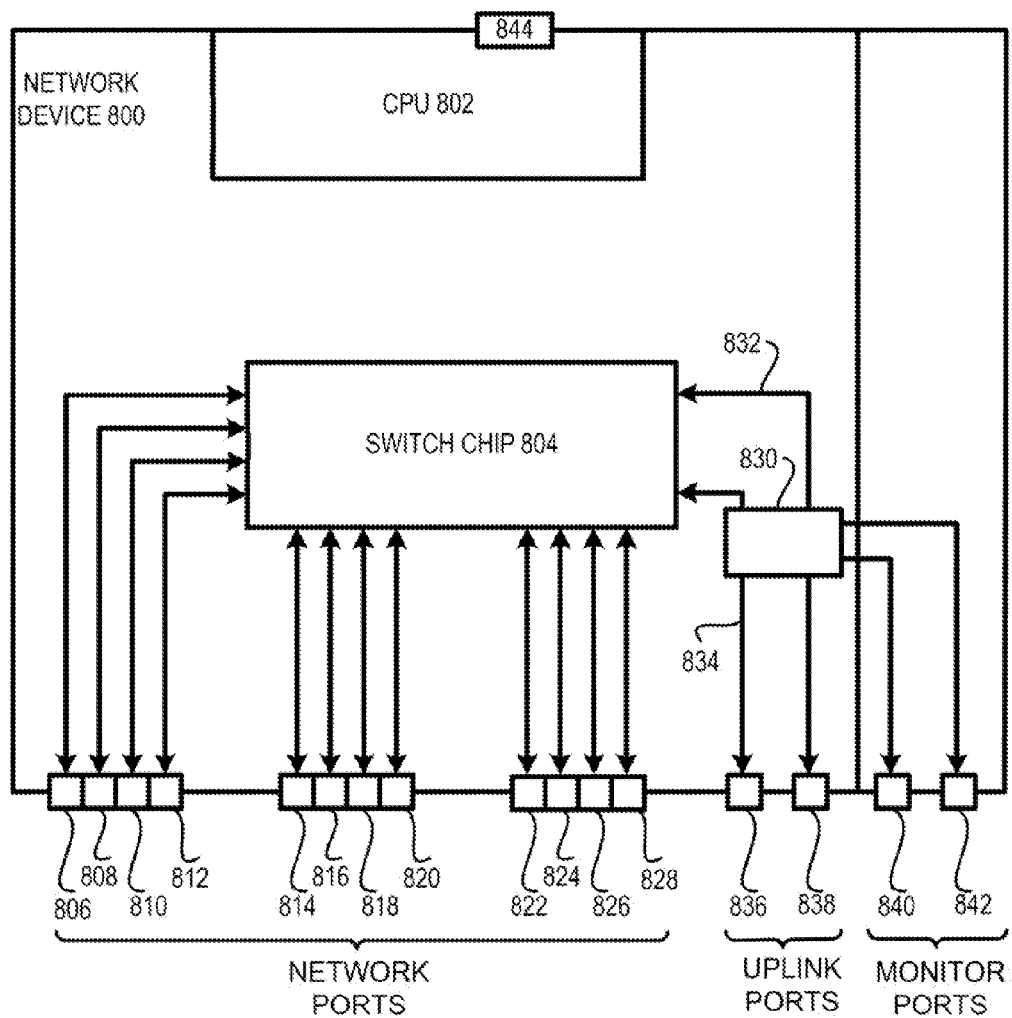
FIG. 8 shows, in an embodiment of the invention, a simple overall diagram of a network switch with an integrated tap arrangement.

FIG. 8 shows, in an embodiment of the invention, a simple overall diagram of a network switch with an integrated tap arrangement. An integrated switch tap device 800 may include a plurality of network ports (806, 808, 810, 812, 814, 816, 818 820, 822, 824, 826, and 828). Each of the network ports is configured to be bidirectional such that each port may have an input network port for receiving inbound traffic and an output network port for forwarding outbound traffic. Upon receiving a data packet, the input network port may forward the data packet to a switch chip 804. After analyzing and determining the destination of the data packet, switch chip 804 may forward the data packet to one of the uplink ports (836 and 838).

To facilitate monitoring of network traffic flowing through integrated switch tap device 800, a tap module 830 may be included as a built-in component, in an embodiment. Tap module 830 may be configured to intercept data traffic and to duplicate the data traffic in order to forward the data traffic to one of the monitoring ports, such as monitoring ports 840 and 842. In an embodiment, tap module 830 may include a filtering functionality. Unlike the prior art solution of a switch device with mirroring functionality, the filtering functionality that is built into tap 830 is user-configurable.

In an example, a user may be interested in the network traffic that may be flowing through the network device via a specific source port, regardless if the data packets may include error. However, in the prior art, a switch chip with mirroring functionality may be configured to filter out any error that may occur in the network traffic; thus, the user may never have the opportunity to analyze the error that may be occurring. Unlike the prior art, tap module 830 includes user-configurable filtering functionality, thereby enabling a user to define the type of data packets that the user may want to monitor or may want to drop. Thus, instead of being subjected to the whim of the switch device, the user may now have control over the type of data packets that may be sent to a monitoring tool for analysis.

In an embodiment, tap module 830 may include a processor, thereby enabling tap module 830 to perform processing without having to access the main processor (CPU 802) of integrated switch tap device 800. Since the monitoring and filtering functionality are now being performed by tap module 830 instead of switch chip 804, the risk of overload to CPU 802 is minimized since CPU 802 is not required to handle additional functionalities, such as mirroring functionality. Even if the CPU 802 becomes overloaded and other secondary functionalities are turn off to preserve the primary function of a network switch, tap module 830 may continue to perform its monitoring and filtering functions since tap module 830 has its own independent processor.

In an embodiment, tap module 830 may be positioned between switch chip 804 and one or more of the uplink ports (836 and 838). By positioning tap module 830 between the switch chip and the set of uplink ports, tap module 830 is able to intercept the network traffic that is being sent between the switch chip 804 and the uplink ports. In one embodiment, an integrated switch tap device 800 may include a plurality of tap modules. In an example, for each uplink port, a tap module may be associated with the uplink port. For example, in one embodiment, a tap module may be associated with a first uplink port while a second tap module may be associated with a second uplink port (not shown in figure).

In yet another embodiment, a single tap module may be employed to monitor network traffic flowing to more than one uplink ports. In an example, a single tap module may be configured to handle both the network traffic flowing to uplink port 836 and uplink port 838. In such an arrangement, the tap module may employ an aggregator, in an embodiment, to aggregate the network traffic flowing from both paths 832 and 834 before duplicating and filtering the network traffic. In an example, data packets ABCD are received from path 832 and data packets GHIJ are received from path 834. An aggregator may combine network traffic from both paths before duplicating the data packets. Once the data packets have been duplicated, the tap module may apply filtering to determine which data packets are kept and the destination of each data packet. For example, the user may have established Filtering rules that require all emails (e.g., data packets A and H) to be handled by a monitoring tool connected to monitoring port 842. As a result, data packets AH are sent via monitoring port 842 to the monitoring tool while data packets BCDGIJ are sent to the other set of monitoring tools via monitoring port 840.

Since tap module 830 may handle both inbound and outbound traffic (i.e., data packets coming from the source ports and the uplink ports, respectively), network traffic congestion may occur. In an embodiment, integrated switch tap device 800 may include a buffering component, thereby enabling tap module 830 to handle potential network traffic congestion flowing to the monitoring ports (840 and 842). In an example, the amount of data packets flowing to monitoring port 840 may exceed the capacity that monitoring port 840 may be able to handle. To minimize network traffic congestion, a buffering component may be configured to buffer data traffic, thereby managing data traffic flow to the monitor ports. By implementing a buffering component, data packets that may have been unintentionally dropped in the prior art due to network traffic congestion may now be buffered until the monitoring port is ready to receive the data packets.

In an embodiment, integrated switch tap device 800 may include a switch chip with mirroring functionality. In other words, a user has the option of turning on the mirroring functionality if the user has a desire to apply the filtering functionality of the switch chip. By providing the user with an option to choose the mirroring functionality, additional monitoring functions may be supported. However, even if CPU 802 become overloaded and the mirroring functionality is turned off, a user does not lose visibility of the network traffic since the network traffic is still being duplicated by tap module 830, which is not dependent upon CPU 802.

In another embodiment, if one of the uplink ports is not associated with a tap module, an external tap arrangement may be utilized to monitor the network traffic flowing through the uplink port. In an example, a third uplink port (not shown) is not associated with tap module 830. If the user wants to monitor the network traffic flowing through the third uplink port, the user may have the option of attaching an external in-line tap arrangement to the third uplink port.

As can be appreciated from FIG. 8, an integrated switch tap device enables the network device to integrate tap and switch functionalities into a single device. As a single device, integrated switch tap device 800 occupies less physical space and/or consume less power than a network switch with an external in-line tap arrangement. In addition, as a single device, the management of the network device is simpler than that of managing multiple network devices. In an example, with a single management port 844, an administrator may be able to configure and maintain both the switch and tap functionalities. In the prior art, an administrator may have the challenge of trying to integrate the switch device with the tap device, which may be of different makes and models. However, with both functionalities incorporated into a single device, the administrator no longer has to perform complex configurations to enable both functions to mesh with one another.

Figure 9:
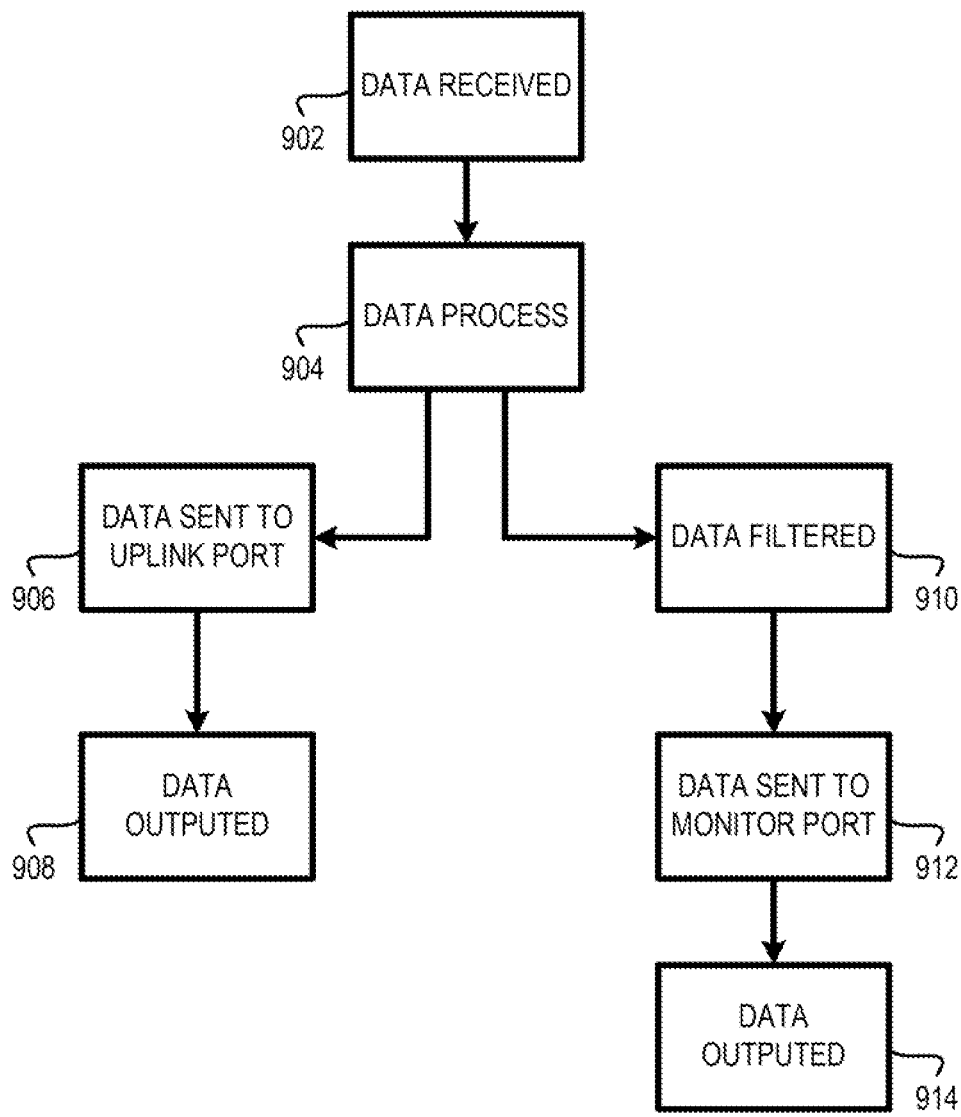
FIG. 9 shows, in an embodiment of the invention, a simple flowchart illustrating the steps for enabling monitoring within an integrated switch tap device.

FIG. 9 shows, in an embodiment of the invention, a simple flowchart illustrating the steps for enabling monitoring within an integrated switch tap device. To facilitate discussion, FIG. 9 will be discussed in relation to FIG. 8.

As a first step 902, a set of data packet is received by a tap module. Consider the situation wherein, for example, network traffic is being received by switch chip 804 via network port 808. After analyzing the data, switch chip may forward the set of data packet to an uplink port, such as uplink port 842. In an embodiment, tap module 830 may intercept the set of data packets.

At a next step 904, the set of data packets is processed. In an example, tap module 830, upon receiving the data, may duplicate the data.

Once the set of data packets has been duplicated, at a next step 906, the set of data packets may be forwarded to an uplink port.

At a next step 908, the set of data packets is forwarded to the next destination. In an example, the set of data packets may be forwarded to a router.

Returning to step 904, once the data has been duplicated, at a next step 910, the set of data packets may be filtered. In an example, the set of monitoring tools attached to monitoring port 840 is only interested in email packets. Thus, instead of sending the entire network traffic to monitoring port 840, tap module 830 may filter out the email packets and forward the email packets to monitoring port 840 while directing all other data packets to monitoring port 842 (step 912). In an embodiment, a buffer component may be employed to temporarily store data packets if network traffic congestion is occurring at one of the monitoring ports.

Once the data packets have flow to their respective monitoring ports, at a next step 914, the data packets are outputted to the designated set of monitoring tools.

As can be appreciated from one or more embodiments of the invention, an integrated switch tap arrangement provides a monitoring environment that is user-configurable. With a user-configurable tap module, administrators of networks have control over the type of data packets that are monitored. By implementing switch and tap functionalities within a single network device, routing and monitoring network traffic may concurrently exist without the monitoring functionally ever having to be sacrificed to preserve the routing functionality since each function is controlled by different processors. Also, by integrating the functionalities into a single device, cost-saving may be had since less physical space is required to store the hardware.

In one aspect of the invention, the inventors realize that statistical data collected by the monitoring tools about a high density network device, such as a network switch, are usually not readily available to an administrator and/or technician. For example, to access the statistical data collected, an administrator may have to go to a computer system and log onto the system before the administrator may be able to determine the health of the network device. To facilitate monitoring, a quick and convenient method for retrieving the statistical data, such as the utilization rate of each network port, may substantially reduce the time IT personnel may spend on supporting a network.

The inventors herein realized that the aforementioned visual performance display arrangement for a low density network device, such as a port aggregator, may also be applied to a high density network device (e.g., network switch, router, etc.). In accordance with embodiments of the invention, a high density network device with a visual performance display arrangement is provided.

Figure 10:
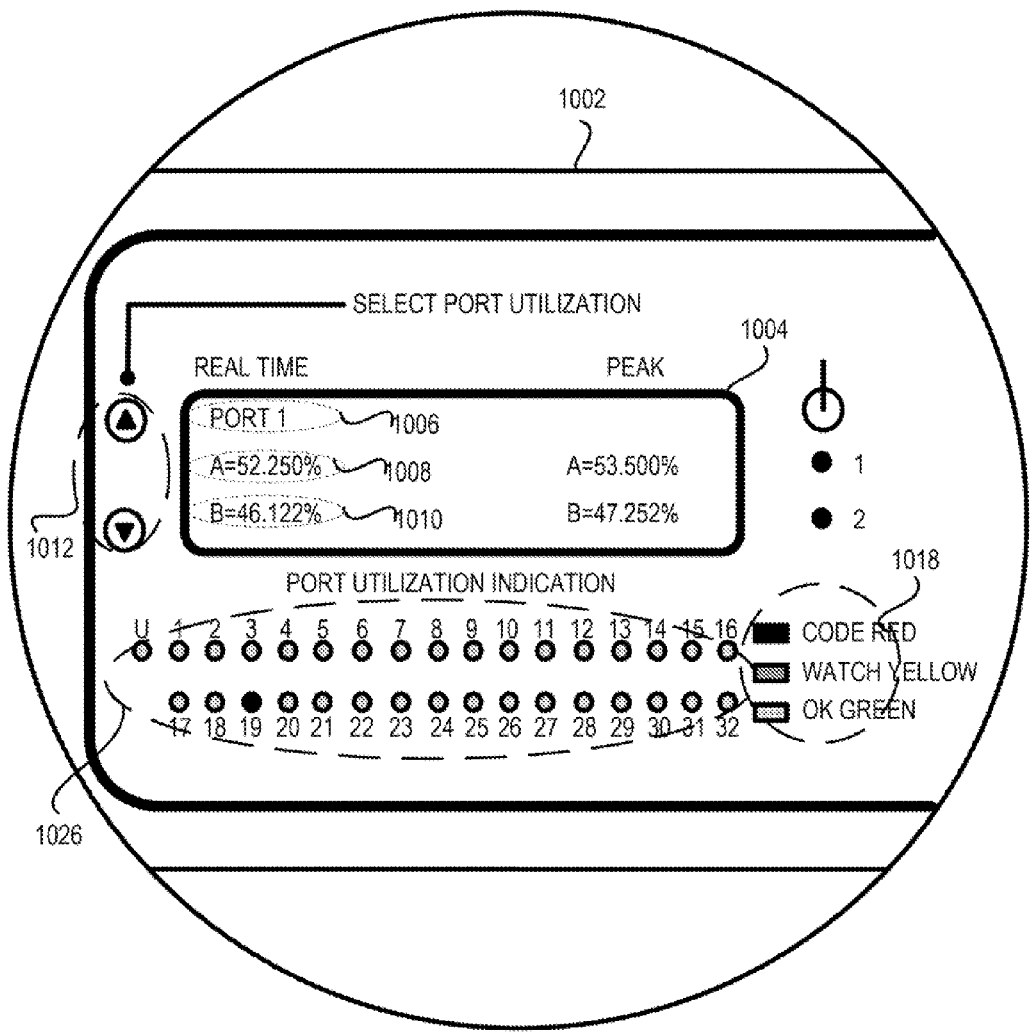
FIG. 10 shows, in an embodiment of the invention, a simple diagram of a partial view of a visual performance display arrangement of a high density network device, such as an integrated switch tap device.

FIG. 10 shows, in an embodiment of the invention, a simple diagram of a partial view of a visual performance display arrangement of a high density network device, such as an integrated switch tap device.

To facilitate the monitoring of each network ports of a network device 1002, a port indicator may be employed to display the status of a network port. In an example, network device 1002 may include 32 network ports. Each of the network ports may be associated with a LED port indicator (as shown by cluster of port indicators 1026). In an embodiment, the color of the LED port indicator may provide a quick status of each network port. In an example, based on color legend 1018, a red LED indictor represents a network port that may require immediate attention. However, a yellow LED indicator may represent a network port that may bear watching. Whereas, a green LED indicator may denote that the network port is behaving as expected. For example, all but network port 19 has a green LED indicator. Unlike the prior art, an IT personnel may be able to quickly access the health of a network port and promptly handle the anomaly.

In an embodiment of the invention, network device 1002 with a visual performance display arrangement 1004 may be provided for displaying vital network parameters (e.g., real-time utilization rate, average utilization rate, highest peak of traffic peaks, traffic types, fault conditions, etc.). Visual display arrangement 1004 may be a non-opaque viewing screen, such as an LCD (liquid crystal display) screen.

In an embodiment, network parameters for each network port may be displayed. In one embodiment, both the inbound port and the outbound port of a network port may be displayed. The network parameters may be displayed as text and/or graphically.

In an embodiment, statistical data about a network port is being periodically updated. Thus, the data that may be shown may reflect real-time numbers. In an example, for network port 1 (1006) the inbound real-time utilization rate is 52.250 percent (1008) and the outbound real-time utilization rate is 46.122 percent (1010).

In another embodiment, highest peak statistical data for each network port may also be displayed. In an example, the highest peak for inbound port of network port 1 has been 53.500 percent and 47.252 percent for outbound port. By having the data readily available, IT personnel may quickly determine the health of a network port. With a visual performance display arrangement, the task of monitoring the health of a network may become more efficient since the network parameters may be visually available without accessing a computer to retrieve the statistical data about a network port.

Due to physical limitation, the size of visual display arrangement 1004 may only be able to visually display a limited amount of data. In an embodiment, the statistical data that may be displayed may be cycled. In other words, to enable the data about each network ports to be displayed, different methods may be employed to determine when the statistical data may be cycled. In an example, the statistical data may be displayed based on a pre-defined time period. In another example, a control component, such as a set of buttons 1012, may be available to enable IT personnel to quickly retrieve the desired data parameters. As can be appreciated from the foregoing, other physical implementation, such as rolling wheels, may be utilized to scroll through the statistical data.

As can be appreciated from one or more embodiments of the invention, a visual display arrangement for a high density network device provides a quick status of each port of the network device. With a visual display arrangement, IT personnel may be able to maintain and monitor the health of the network. As a result, IT personnel may become more efficient in monitoring the network and have more time to address anomalies that may require attention.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An integrated switch tap device for managing and monitoring network traffic, comprising:
  a set of network ports, said set of network ports being configured for at least one of receiving said network traffic and outputting said network traffic from said integrated switch tap device, said set of network ports including at least a first network port;
  a first logic arrangement configured at least for performing routing functionalities, wherein said routing functionalities including analyzing said network traffic, determining a destination for at least a portion of said network traffic, and directing said network traffic from said first network port to a second network port of said set of network ports;

a first central processing unit (CPU) configured at least for processing said routing functionalities;

a set of monitoring ports, said set of monitoring ports being coupled to one or more monitoring devices;

a first tap module, said first tap module being configured at least for intercepting at least part of said network traffic flowing through said integrated switch tap device, creating a copy of said at least part of said network traffic, and forwarding said copy of said at least part of said network traffic to at least one of said set of monitoring ports;

said first tap module including a filtering functionality, wherein said filtering functionality includes identifying types of data packets from said network traffic for forwarding to said at least one of said monitoring ports, wherein said filtering functionality is user-configurable; and a second CPU separate from the first CPU configured at least for processing tap functionalities associated with said first tap module, whereas said network traffic is configured to traverse said integrated switch tap device whether power is provided to circuitry of said integrated switch tap device.

2. The integrated switch tap device of claim 1 further including a mirroring functionality, wherein said mirroring functionality includes said creating of said copy of said at least part of said network traffic.

3. The integrated switch tap device of claim 2 wherein said first tap module is configured for performing said mirroring functionality.

4. The integrated switch tap device of claim 3 wherein said first logic arrangement is configured for performing said mirroring functionality.

5. The integrated switch tap device of claim 1 wherein each network port of said set of network ports is bidirectional and include at least an input network port for receiving inbound network traffic and an output network port for forwarding outbound network traffic.

6. The integrated switch tap device of claim 1 wherein said first tap module includes an aggregator functionality, wherein said aggregator functionality includes aggregating data packets received from said set of network ports.

7. The integrated switch tap device of claim 6 further including a buffering component, wherein said buffering component is positioned between said first tap module and said set of monitoring ports, wherein said buffering component is configured at least for managing network traffic to said set of monitoring ports.

8. The integrated switch tap device of claim 7 further including a second tap module, wherein said second tap module being configured at least for intercepting at least part of said network traffic flowing through said integrated switch tap device, creating a copy of said at least part of said network traffic, and forwarding said copy of said at least part of said network traffic to at least one of said set of monitoring ports, wherein said second tap module is not said first tap module.

9. The integrated switch tap device of claim 8 further including a second logic arrangement for analyzing said network traffic and for displaying statistical data pertaining to said network traffic.

10. The integrated switch tap device of claim 9 further including a visual display arrangement is one of a non-opaque viewing arrangement and an LCD (liquid crystal display) screen.

11. The integrated switch tap device of claim 10 wherein said statistical data displayed on said visual display arrangement is configured to be cycled through.

12. The integrated switch tap device of claim 9 further including a port indicator, wherein said port indicator is configured to display status of a network port of said set of network ports.

13. An integrated switch tap device for managing and monitoring network traffic, comprising:

a set of network ports, said set of network ports including a set of input network ports for receiving said network traffic and a set of output network ports for forwarding said network traffic, said set of network ports including at least a first network port with a first input network port and a first output network port;

a set of uplink ports, wherein said set of uplink ports is configured for receiving said at least part of said network traffic from said set of network ports;

a logic arrangement configured at least for performing routing functionalities, wherein said routing functionalities including analyzing said network traffic, determining a destination for at least a portion of said network traffic, and directing said network traffic from one of said set of network port to one of said set of uplink ports;

a first central processing unit (CPU) configured at least for processing said routing functionalities;

a set of monitoring ports, said set of monitoring ports being coupled to one or more monitoring devices;

a first tap module, said first tap module being configured at least for intercepting at least part of said network traffic flowing through said integrated switch tap device, creating a copy of said at least part of said network traffic, and forwarding said copy of said at least part of said network traffic to at least one of said set of monitoring ports;

a second CPU separate from the first CPU configured at least for processing tap functionalities associated with said first tap module, whereas said network traffic is configured to traverse said integrated switch tap device whether power is provided to circuitry of said integrated switch tap device;

wherein said first tap module includes
  a mirroring functionality, wherein said mirroring functionality includes said creating of said copy of said at least part of said network traffic,
  a filtering functionality, wherein said filtering functionality includes identifying types of data packets from said network traffic for forwarding to said at least one of said monitoring ports, wherein said filtering functionality is user-configurable; and
  an aggregator functionality, where said aggregator functionality includes aggregating data packets received from said set of network ports.

14. The integrated switch tap device of claim 13 further including a buffering component, wherein said buffering component is positioned between said first tap module and said set of monitoring ports, wherein said buffering component is configured at least for managing network traffic to said set of monitoring ports.

15. The integrated switch tap device of claim 14 wherein said first tap module is positioned between said logic arrangement and said set of uplink ports, wherein said first tap module is configured for intercepting said network traffic before said network traffic is sent to said set of uplink ports.

16. The integrated switch tap device of claim 15 further including a second tap module, wherein said second tap module being configured at least for intercepting at least part of said network traffic flowing through said integrated switch tap device, creating a copy of said at least part of said network traffic, and forwarding said copy of said at least part of said network traffic to at least one of said set of monitoring ports, wherein said second tap module is not said first tap module.

17. The integrated switch tap device of claim 16 wherein said second tap module is positioned between said logic arrangement and at least one uplink port of said set of uplink ports, wherein said second tap module is not said first tap module.

\* \* \* \* \*